(12) United States Patent
Hei et al.

(10) Patent No.: US 8,235,465 B2
(45) Date of Patent: Aug. 7, 2012

(54) MODULAR CHILD RESTRAINT SYSTEM

(75) Inventors: Joseph Hei, Palo Alto, CA (US); Bryan T. White, Fremont, CA (US)

(73) Assignee: Orbit Baby, Inc., Newark, CA (US)

( * ) Notice: Subject to any disclaimer, the term of this patent is extended or adjusted under 35 U.S.C. 154(b) by 0 days.

(21) Appl. No.: 12/848,869

(22) Filed: Aug. 2, 2010

(65) Prior Publication Data

US 2010/0314925 A1  Dec. 16, 2010

Related U.S. Application Data

(60) Continuation of application No. 12/483,945, filed on Jun. 12, 2009, now Pat. No. 7,770,970, which is a division of application No. 11/926,851, filed on Oct. 29, 2007, now Pat. No. 7,559,606, which is a continuation of application No. 11/132,103, filed on May 17, 2005, now Pat. No. 7,338,122.

(60) Provisional application No. 60/571,791, filed on May 17, 2004, provisional application No. 60/610,774, filed on Sep. 17, 2004, provisional application No. 60/610,686, filed on Sep. 17, 2004, provisional application No. 60/611,177, filed on Sep. 17, 2004, provisional application No. 60/610,800, filed on Sep. 17, 2004.

(51) Int. Cl.
*A47D 1/10* (2006.01)
*A47C 13/00* (2006.01)

(52) U.S. Cl. ............... 297/256.16; 297/256.12; 297/130

(58) Field of Classification Search ............. 297/256.12, 297/256.16, 344.22, 130; 248/418, 349.1
See application file for complete search history.

(56) References Cited

U.S. PATENT DOCUMENTS

| 1,634,922 | A |   | 7/1927  | Stubblebine at al. |
|-----------|---|---|---------|--------------------|
| 4,750,783 | A | * | 6/1988  | Irby et al. ............... 297/256.16 |
| 4,762,364 | A |   | 8/1988  | Young |
| 4,834,404 | A |   | 5/1989  | Wood |
| 4,936,629 | A |   | 6/1990  | Young |
| 5,058,283 | A |   | 10/1991 | Wise et al. |
| 5,183,312 | A |   | 2/1993  | Nania |
| 5,207,476 | A |   | 5/1993  | Payne |

(Continued)

FOREIGN PATENT DOCUMENTS
EP          0 939 019 A1      9/1999
(Continued)

OTHER PUBLICATIONS

Partial European Search Report mailed on Jun. 20, 2011, for EP Patent Application No. 05751808.6, filed on May 17, 2005, 6 pages.

*Primary Examiner* — Milton Nelson, Jr.
(74) *Attorney, Agent, or Firm* — Morrison & Foerster LLP

(57) ABSTRACT

A modular child restraint system for use in vehicles comprises a base and interchangeable attachable seats where the seats are for different stages of childhood development. The system can further comprise additional bases adapted to other uses such as strollers and infant swings. A common engagement mechanism allows the various seats to be moved from one base to another. One such system comprises a base and a seat configured to rotate relative to one another when engaged. The seat can also lock in a position relative to the base. The base includes a visual indicator to show that the seat is secured to the base.

19 Claims, 22 Drawing Sheets

U.S. PATENT DOCUMENTS

| Patent No. | Kind | Date | Inventor | Ref |
|---|---|---|---|---|
| 5,341,530 | A | 8/1994 | Ward | |
| 5,462,333 | A | 10/1995 | Beauvais | |
| 5,540,365 | A | 7/1996 | LaMair | |
| 5,562,548 | A | 10/1996 | Pinch et al. | |
| 5,599,065 | A | 2/1997 | Gryp et al. | |
| 5,658,044 | A | 8/1997 | Krevh | |
| 5,659,931 | A | 8/1997 | Anscher | |
| 5,775,770 | A | 7/1998 | Tunney | |
| 5,908,223 | A | 6/1999 | Miller | |
| 5,961,180 | A | 10/1999 | Greger et al. | |
| 5,971,476 | A | 10/1999 | Gibson et al. | |
| 6,000,753 | A | 12/1999 | Cone, II | |
| 6,017,088 | A | 1/2000 | Stephens et al. | |
| 6,049,954 | A | 4/2000 | Britto | |
| 6,076,894 | A | 6/2000 | Busch | |
| 6,145,927 | A | 11/2000 | Lo | |
| 6,189,970 | B1 | 2/2001 | Rosko | |
| 6,193,312 | B1 * | 2/2001 | Yoshida et al. | 297/256.16 |
| 6,196,629 | B1 | 3/2001 | Onishi et al. | |
| 6,241,314 | B1 | 6/2001 | Pufall | |
| 6,260,903 | B1 | 7/2001 | von der Heyde | |
| 6,260,920 | B1 * | 7/2001 | Tolfsen | 297/256.16 |
| 6,283,545 | B1 | 9/2001 | Ernst | |
| 6,322,142 | B1 | 11/2001 | Yoshida et al. | |
| 6,331,032 | B1 * | 12/2001 | Haut et al. | 297/130 |
| 6,393,677 | B1 | 5/2002 | Anscher | |
| 6,428,100 | B1 * | 8/2002 | Kain et al. | 297/256.16 |
| 6,431,647 | B2 | 8/2002 | Yamazaki | |
| 6,446,990 | B1 | 9/2002 | Nania et al. | |
| 6,508,510 | B2 | 1/2003 | Yamazaki | |
| 6,554,358 | B2 | 4/2003 | Kain | |
| 6,561,577 | B2 | 5/2003 | Kelly | |
| 6,619,734 | B2 | 9/2003 | Helmsderfer | |
| 6,793,283 | B1 | 9/2004 | Sipos | |
| 6,796,606 | B2 * | 9/2004 | Marshall | 297/182 |
| 6,857,700 | B2 | 2/2005 | Eastman et al. | |
| 6,863,345 | B2 | 3/2005 | Kain | |
| 6,938,954 | B1 | 9/2005 | Hendren et al. | |
| 7,004,541 | B2 | 2/2006 | Sedlack | |
| 7,163,265 | B2 | 1/2007 | Adachi | |
| 7,338,122 | B2 | 3/2008 | Hei et al. | |
| 7,559,606 | B2 | 7/2009 | Hei et al. | |
| 7,770,970 | B2 | 8/2010 | Hei et al. | |

FOREIGN PATENT DOCUMENTS

| | | | |
|---|---|---|---|
| GB | 2 207 043 A | | 1/1989 |
| GB | 2207043 A | * | 1/1989 |

* cited by examiner

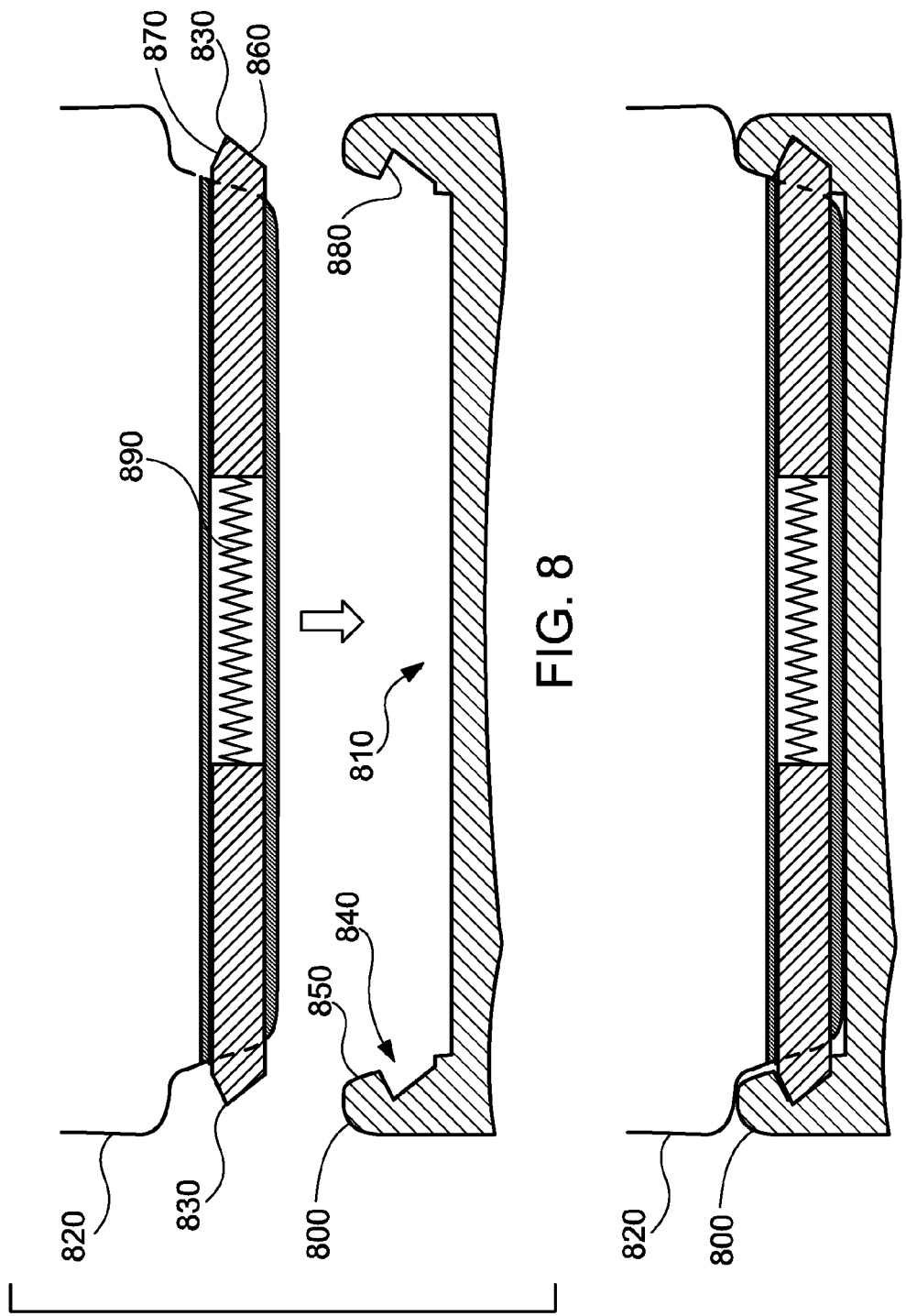

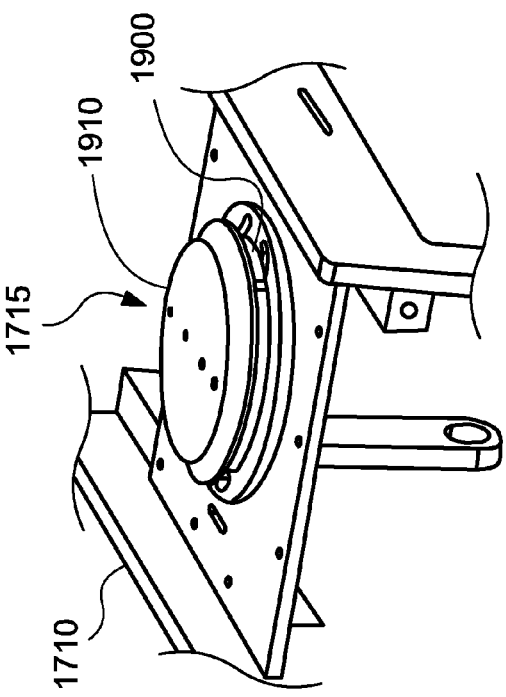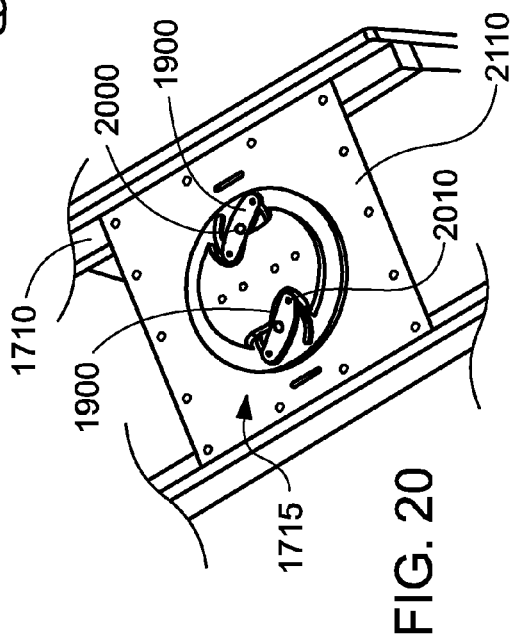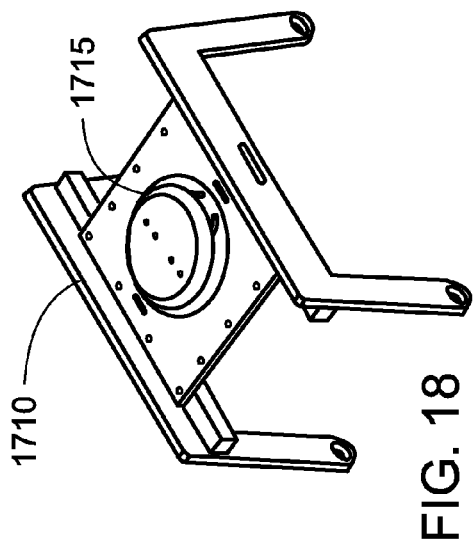

MODULAR CHILD RESTRAINT SYSTEM

CROSS-REFERENCE TO RELATED APPLICATIONS

This application is a Continuation of U.S. application Ser. No. 12/483,945, filed Jun. 12, 2009, now U.S. Pat. No. 7,770,970, issued on Aug. 10, 2010, which is a Divisional of U.S. application Ser. No. 11/926,851, filed Oct. 29, 2007, now U.S. Pat. No. 7,559,606, issued on Jul. 14, 2009, which is a Continuation of U.S. application Ser. No. 11/132,103, filed May 17, 2005, now U.S. Pat. No. 7,338,122, issued on Mar. 4, 2008, which claims the benefit of U.S. Provisional Application No. 60/571,791 filed on May 17, 2004, and titled "Child Car Seat with Improvements," which is now expired, and U.S. Provisional Application Nos. 60/610,774, 60/610,686, 60/611,177, and 60/610,800 each filed on Sep. 17, 2004 and titled, respectively, "Modular Child Restraint System that Involves Rotation and Removal," "Actively Securing Child Restraint Base Interface that Amplifies User Leverage," "Modular Upgradeable Child Restraint System," and "Child Vehicle Restraints;" all of which are now expired, all five applications are incorporated herein by reference in their entirety for all purposes. This application is further related to U.S. application Ser. No. 11/131,662, filed May 17, 2005, now abandoned titled "Actively Securable Base for a Modular Child Restraint System" and U.S. application Ser. No. 11/131,568, filed May 17, 2005 titled "Improvements for Child Restraint Systems", both filed on even date herewith and incorporated herein by reference in their entirety and for all purposes.

BACKGROUND OF THE INVENTION

1. Field of the Invention

The present invention relates generally to the field of transportation safety and more particularly to child carriers for use in vehicles.

2. Description of the Prior Art

Children's car seats have made automobile travel substantially safer for children, however, as most parents are aware, properly installing such seats is typically difficult and sometimes frustrating. One solution has been to develop modular car seat systems with a base that remains semi-permanently installed and a seat that can be readily engaged with the base. With such systems the hard work of installing the base does not have to be frequently repeated.

What is lacking, however, is a modular child's car seat system that is upgradeable with different seats that work with the same base, where the different seats accommodate different stages in the child's development.

BRIEF SUMMARY OF THE INVENTION

The present invention provides a modular child restraint system for use in vehicles. An exemplary modular child restraint system of the invention comprises a plurality of different seats and a base configured to be installed in a vehicle such as an automobile, boat, or airplane. Each of the different seats can engage with the base, and each of the different seats is adapted to a different stage of child development. Thus, one seat can be a rear-facing infant seat, another can be a toddler seat, and yet another can be a booster seat.

Conveniently, the modular child restraint system can further comprise a second base, different than the first base, and that can also be engaged with the various seats. Examples of different second bases include bases adapted to strollers and swings. Even though the bases are different, a common engagement mechanism allows the various seats to be moved from one to another.

Another exemplary modular child restraint system of the invention comprises a base and a seat configured to engage the base and to be able to rotate relative to the base when engaged thereto. The base can be configured to attach to a vehicle seat or can be part of a stroller, for example. In some embodiments the base is permanently installed in a vehicle seat, and can be, for instance, factory installed or installed after-market. In some of these embodiments only an engagement mechanism of the base, such as a base hub, extends above a seat cushion. The seat is configured, in some embodiments, to lock in a position relative to the base. The base can also comprise a visual indicator configured to change color in response to the seat being locked in the position relative to the base.

Still another exemplary modular child restraint system of the invention comprises a base including a base hub having a circumferential lip and a plurality of detents, and a seat including a seat hub configured to rotationally engage with the base hub. The seat, in these embodiments, has a retractable latch configured to engage under the lip to secure the seat hub to the base hub, and lock into the detents to prevent rotation of the seat relative to the base. The modular child restraint system can further comprise an indicator configured to indicate whether the seat hub is rotationally locked with respect to the base hub. In some embodiments the modular child restraint system further comprises four retractable latches configured to engage under the lip. In some of these, only one of the four latches is sized to lock into the detents.

Yet another exemplary modular child restraint system of the invention comprises a base including a base hub having two retaining bars, and a seat including a seat hub configured to rotationally engage with the base hub. The seat hub includes a circumferential lip that engages the two retaining bars to secure the seat to the base. The base hub can further include a retractable locking pin configured to engage the seat hub to prevent rotation of the seat hub relative to the base hub. The seat hub can further include a pair of cams configured to push the retaining bars outward to disengage the seat hub from the base hub. The cams can be vertically or horizontally actuated, for example.

BRIEF DESCRIPTION OF THE DRAWINGS

FIGS. 8 and 9 are cross-sectional views of an engagement mechanism, according to an embodiment of the invention, comprising base and seat hubs before and after engagement, respectively.

FIGS. 18-20 are bottom perspective views of the seat hub of the embodiment of FIG. 17, with FIG. 20 showing the base hub partially disassembled.

DETAILED DESCRIPTION OF THE INVENTION

The present invention provides modular child restraint systems for use in vehicles such as automobiles, aircraft, boats, buses, and so forth. The modular restraint system comprises a base and interchangeable attachable seats. The base serves as the primary interface between the attached seat and a vehicle seat and is designed to be left attached thereto. Each seat is intended to hold a child at a different stage of development and is typically provided with a restraint mechanism such as a harness. One advantage of the modular design is that the same base can be used to support seat that are adapted for different stages of childhood such as for infants, toddlers, and older children. Thus, as a child grows, only the seat needs to be upgraded.

Additionally, the invention provides for a system in which the same seat can be attached to bases adapted for different purposes such as a base for a vehicle seat, a base for a stroller, and so forth. Further the invention provides an advantageous engagement mechanism as an interface between the seat and base. With this engagement mechanism the seat can be rotated relative to the base and locked in essentially any orientation.

Figure 1:
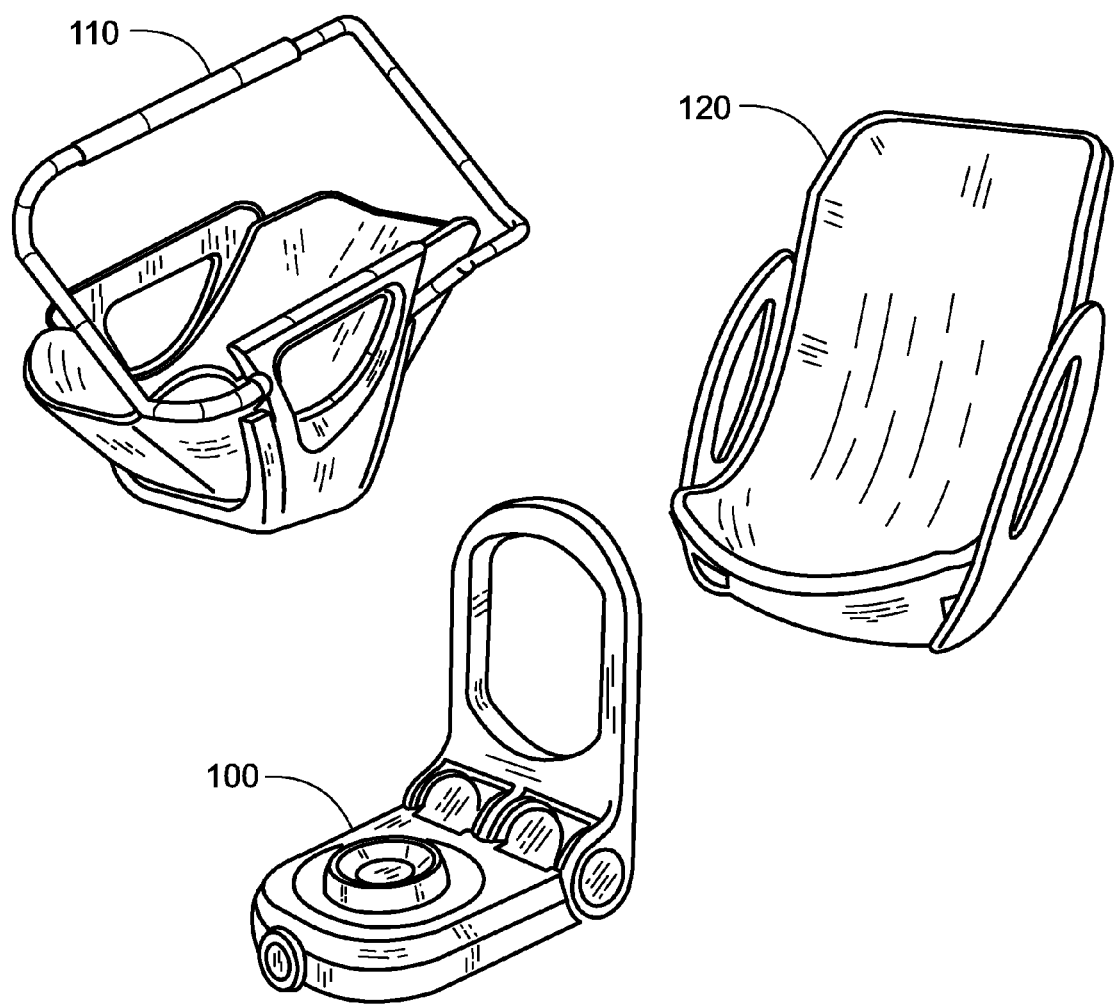
FIG. 1 is a perspective view of a modular restraint system according to an embodiment of the invention comprising a base and interchangeable attachable seats.

FIG. 1 illustrates a modular restraint system comprising a base 100 and interchangeable attachable seats 110 and 120. In some embodiments the base 100 is actively expandable as described in U.S. application Ser. No. 11/131,662, filed May 17, 2005, now abandoned, which is incorporated by reference herein. Other attributes of various embodiments of the base 100 that are described in the aforementioned application include ease of installation, and foldability for portability. Seat 110 is an embodiment of an infant carrier, while seat 120 is an embodiment of a toddler or convertible seat. A convertible seat is one that is adjustable to accommodate a wide range of child sizes and weights so that the same seat can accommodate a growing child for many years. It will be appreciated that the seats 110 and 120 are merely two examples of possible seats that can be attached to the base 100. Another example is a booster seat, for instance.

Figure 2:
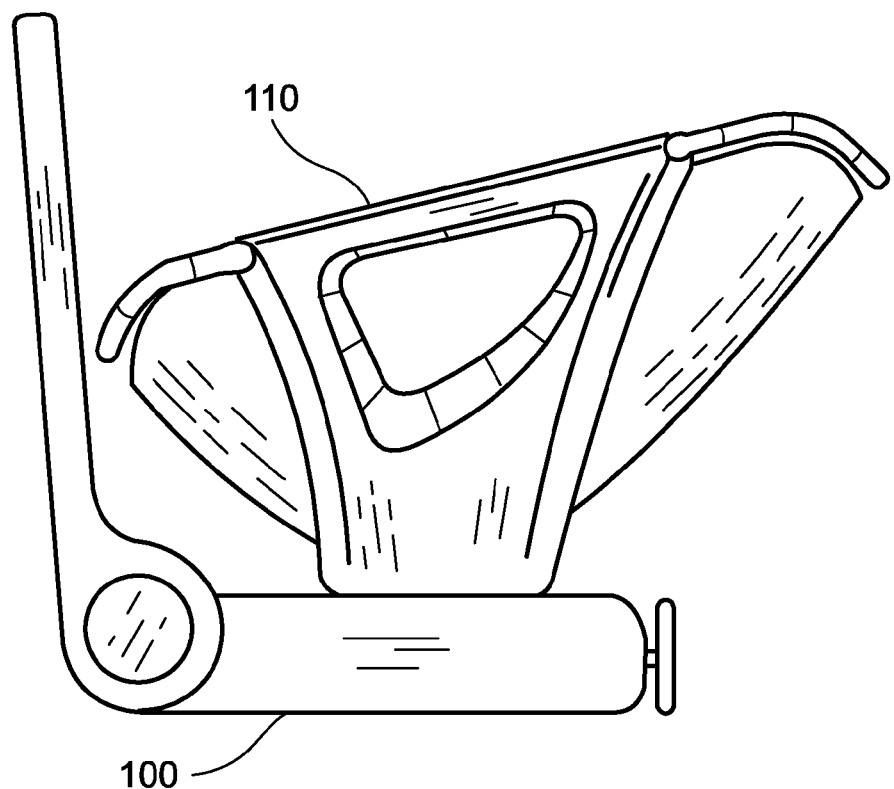
FIG. 2 is a side view of one of the seats of FIG. 1 attached to the base in a rear-facing configuration.
Figure 3:
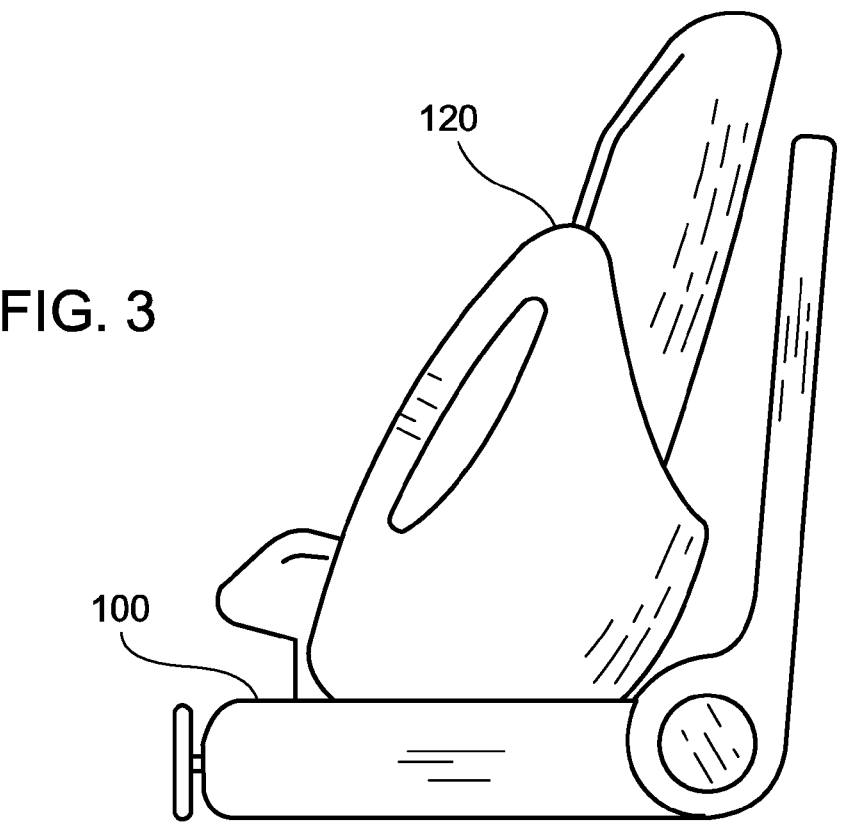
FIG. 3 is a side view of one of the seats of FIG. 1 attached to the base in a forward-facing configuration.
Figure 4:
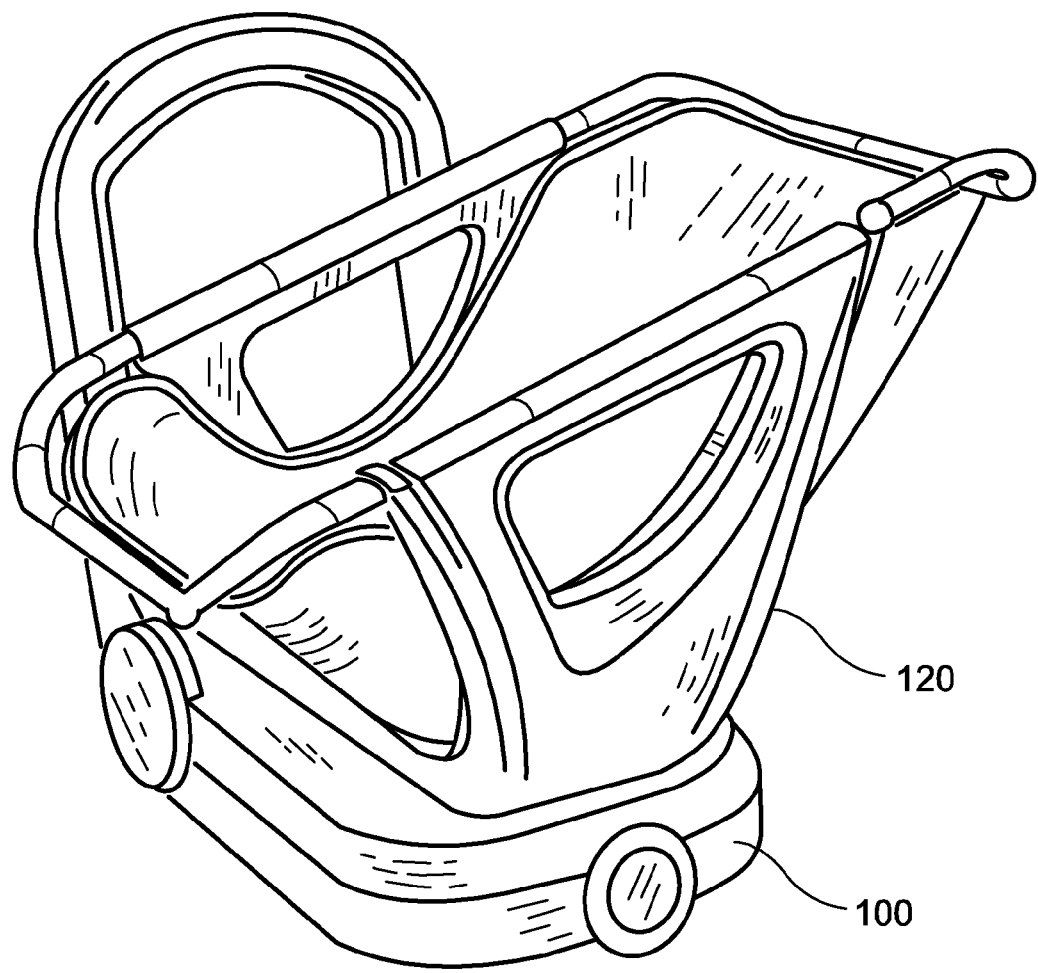
FIG. 4 is a perspective view of the seat of FIG. 2 attached to the base and rotated to face sideways.

FIGS. 2 and 3 show, respectively, the seats 110 and 120 engaged with the base 100. In FIG. 2 the seat 110 is in a rear-facing configuration that is recommended for babies and infants. In FIG. 3 the seat 120 is oriented in a forward-facing configuration that is suitable for older children with sufficient neck strength. As illustrated by FIG. 4, in some embodiments a seat such as seat 120 can be positioned on the base 100 in other orientations as well. While a side-facing orientation may not be desirable in a moving automobile for safety reasons, it will be appreciated that the ability to choose orientations other than forward and rear-facing can be quite desirable in other situations, for example, in a parked automobile, on an airplane, and so forth. Engagement mechanisms that allow for such rotational freedom are discussed in more detail below.

Figure 5:
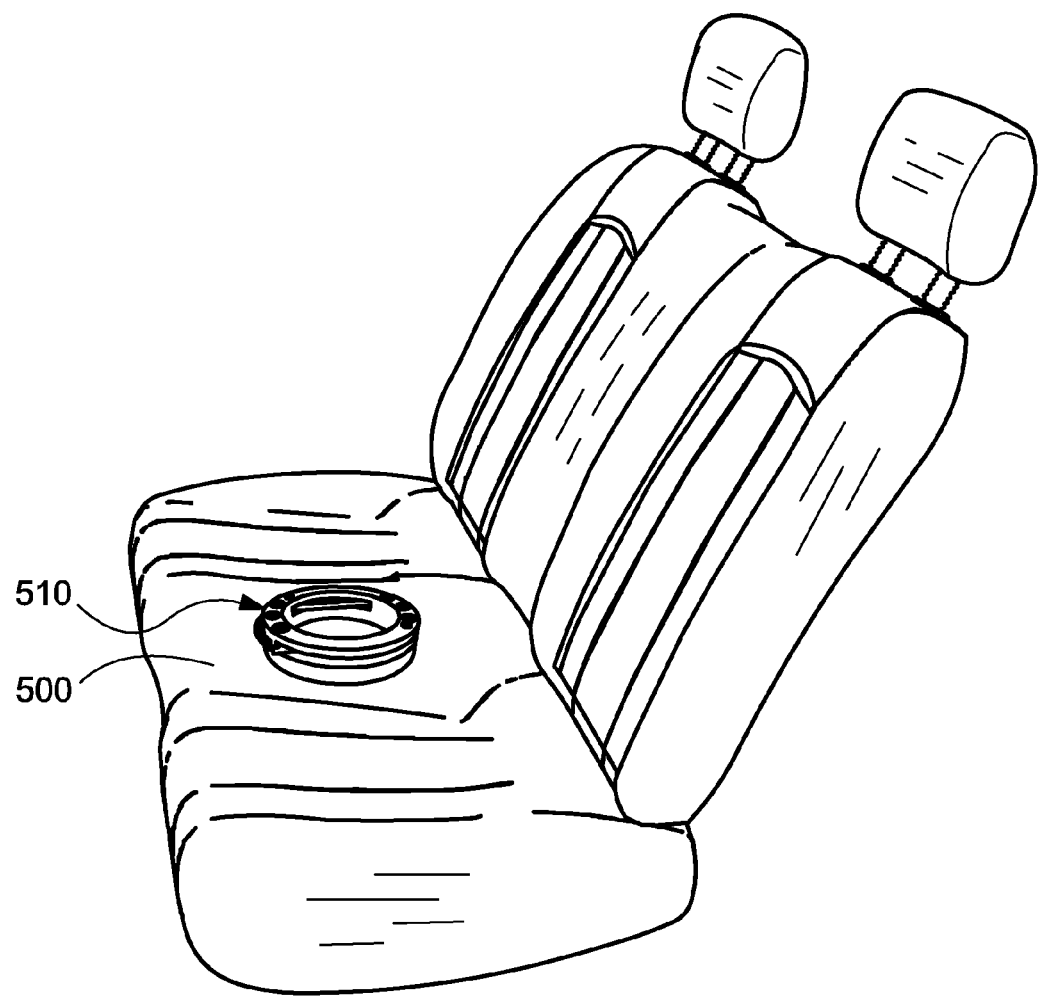
FIG. 5 is a perspective view of a base hub of a base integrated with a vehicle seat, according to an embodiment of the invention, projecting above a seat cushion thereof.

FIG. 5 illustrates an embodiment of the invention in which a base of modular child restraint system is integral with a vehicle seat 500 so that only a base hub 510 of an engagement mechanism projects above the seat cushion. The base can be either factory installed or an after-market add-on. Similarly, the base can be integrated with other structural components of a vehicle such as a folding armrest.

Figure 7:
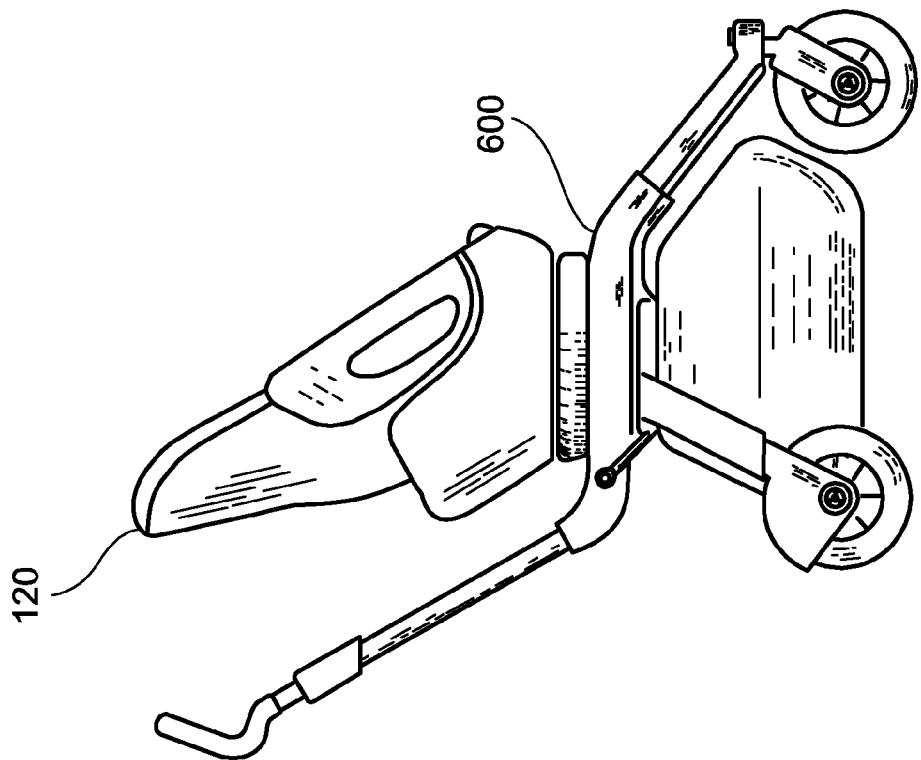
FIGS. 6 and 7 are side views of the seats of FIG. 1 respectively engaged with a base adapted to a stroller, according to an embodiment of the invention.
Figure 6:
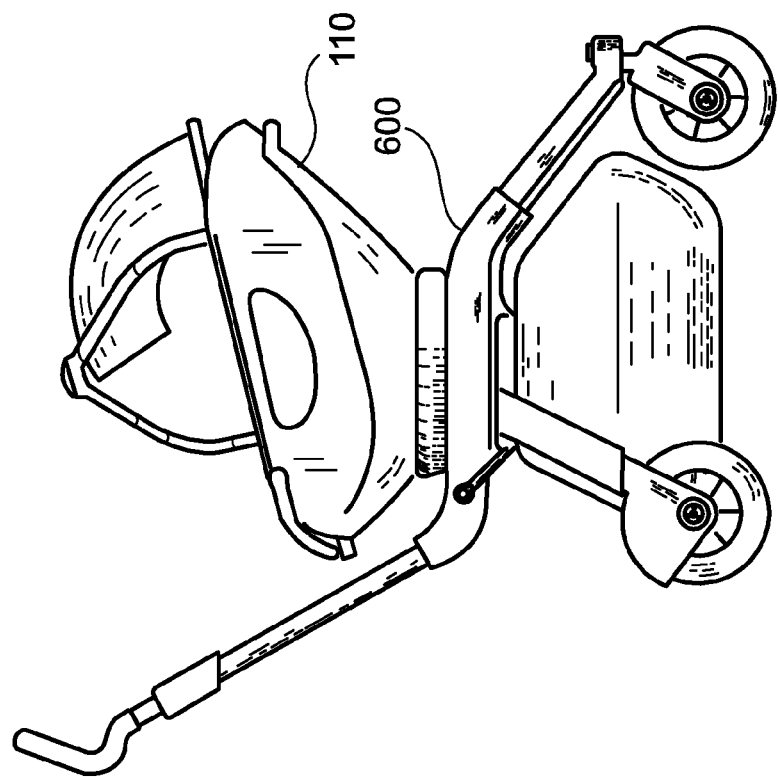

As described above, one base can be used with multiple seats that are adapted to different stages of childhood. Additionally, the invention also provides for the same seat to be used with multiple bases adapted to different vehicles or uses. FIGS. 6 and 7 illustrate the seats 110 and 120, respectively, engaged with a base 600 adapted to another type of vehicle, in this case a stroller. It will be apparent that a base of the invention can likewise be adapted to other uses such as an infant swing, a high chair, and so forth.

As previously noted, embodiments of the engagement mechanism that serve as the interface between the various bases and seats of the modular system provide for easy attachment and disengagement of the two mating components, as well as rotation of the seat relative to the base. FIGS. 8 and 9 schematically illustrate an embodiment of an engagement mechanism in cross-section before and after being engaged, respectively. In FIG. 8 a base hub 800 of the engagement mechanism includes a recess 810 for receiving a seat hub 820 of the engagement mechanism. As shown, the recess 810 and seat hub 820 are shaped so that the seat hub 820 nests snuggly in the recess 810 when the two hubs 800, 820 are engaged (FIG. 9).

To prevent the two hubs 800, 820 from accidentally separating, the seat hub 820 includes spring-loaded latches 830 that project into a circumferential groove 840 and under a lip 850 of the base hub 800. Each latch 830 includes an engaging face 860 that helps guide the seat hub 820 into the recess 810. Forcing the seat hub 820 into the recess 810 pushes the latches 830 laterally against the force of the spring until the latches 830 pass the lip 850 and are driven by the spring into the groove 840. Each latch 830 also includes a retaining face 870 that mates against an underside face 880 of the lip 850.

It can be seen that once the two hubs 800, 820 are engaged, the seat hub 820 is free to rotate within the grove 840 of the base hub 800. It is noted that although two latches 830 share a common spring 890 in FIGS. 8 and 9, each latch 830 can alternately be fitted with a dedicated spring so that the latches operate independently for greater security. It will also be appreciated that the spring can be a coiled spring, a leaf spring, or some other device that provides a similar restorative force. A mechanism (not shown) is configured to fully retract the latches 830 so that the seat hub 820 can be removed from the base hub 800. Embodiments of this mechanism are discussed below.

Figure 10:
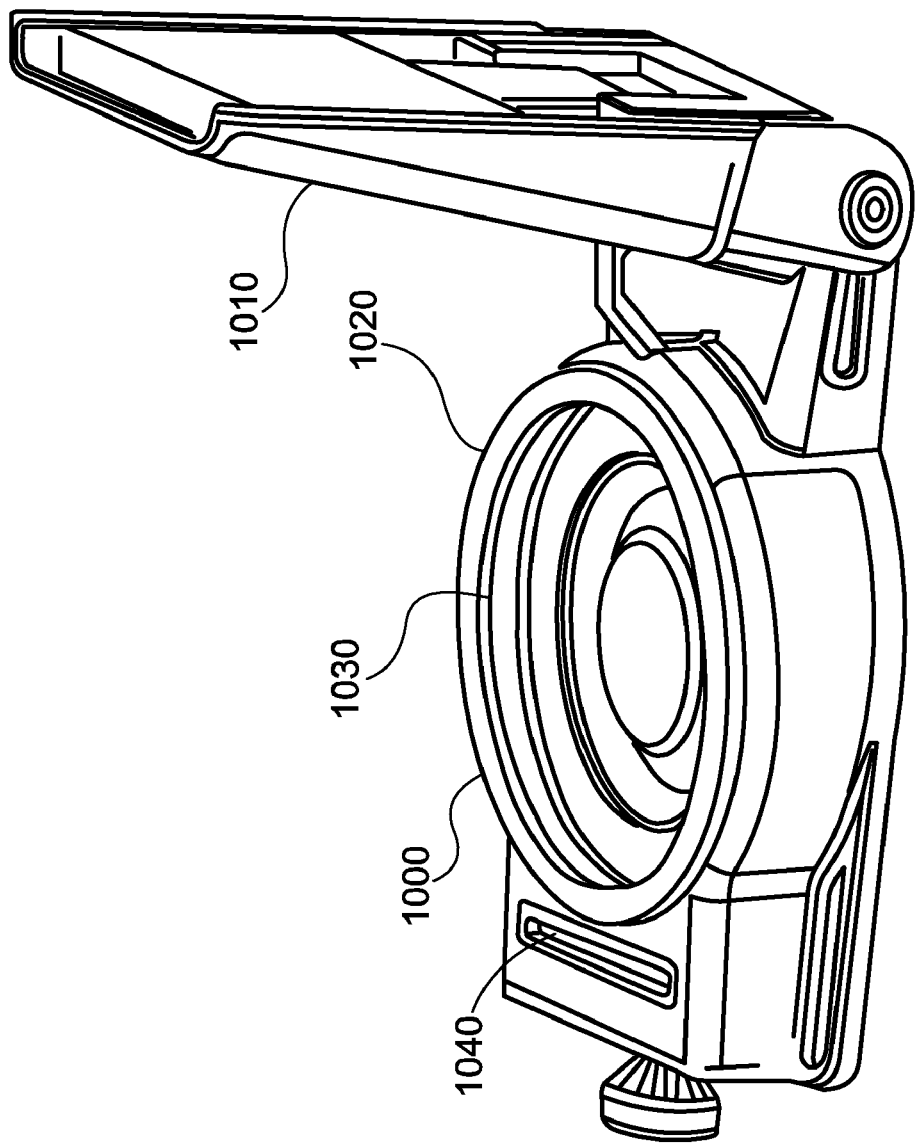
FIGS. 10 and 11A are different perspective views of a base according to an embodiment of the invention.

FIG. 10 shows a perspective view of a base hub 1000 of a base 1010 for use with a vehicle seat. The base hub 1000 includes a groove 1020 for receiving latches of a seat hub (not shown). Within the groove 1020 are several detents 1030 at intervals around the circumference of the groove 1020. When the seat hub is engaged with the base hub 1000 and rotated relative thereto, the latches of the seat hub engage with the detents 1030 to lock the seat hub relative to the base hub 1000 in a particular orientation. Where the seat hub includes two oppositely disposed latches as in FIGS. 8 and 9, the detents 1030 are also oppositely disposed around the groove 1020. Accordingly, eight detents 1030 at 45° intervals will allow the base hub to lock in eight different orientations so that the attached seat can assume eight different orientations.

Some embodiments of the invention employ two, three, or four latches on the seat hub. In some of these embodiments the latches have different widths so that some latches are more narrow than the others. In these embodiments the detents on the base hub are sized to only accommodate the more narrow latch or latches. In this way, for example, a forward-facing seat with four latches can be made to rotate through 360° but only lock in the forward-facing orientation. It is also noted that in some embodiments the seat hub is configured with the groove and detents while the base hub includes the latches.

FIG. 10 also illustrates a locking indicator 1040 on the base 1010. The locking indicator 1040 can be configured to change color, for example, when the seat hub is engaged and disengaged from the base hub 1000 or rotated into or out of a locked orientation. In one embodiment the locking indicator 1040 turns green when the seat hub is engaged and locked with the base hub 1000, and changes to red when the seat hub is unlocked. Thus, a person engaging the seat hub with the base hub 1000 has a visual cue that the two are properly connected.

Figure 11A:
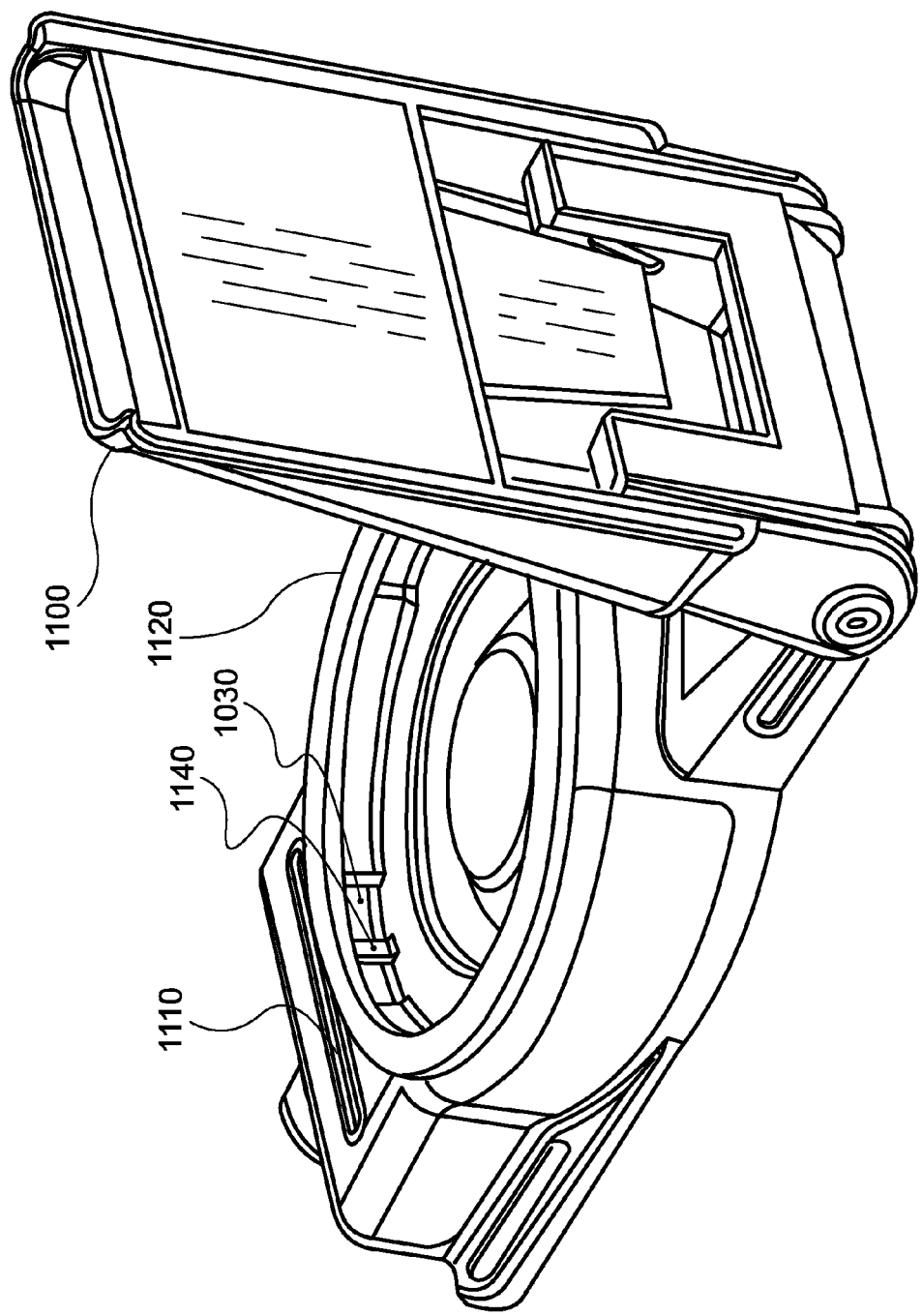

FIG. 11A shows a perspective view of an exemplary base 1100 to better illustrate one possible embodiment of a locking indicator 1110 and associated mechanism. The base 1100 includes a base hub 1120 having a detent 1130. In the detent 1130 is an actuator 1140 that is pushed by a latch of the seat hub when the seat hub is engaged. A spring-loaded mechanical linkage (not shown) within the base hub 1120 connects the actuator 1140 to a plastic piece beneath a window of the locking indicator 1110. The plastic piece has two colored strips thereon, one to indicate the unlocked state, and the other to indicate the locked state. The mechanical linkage keeps the strip for the unlocked state displayed in the window unless a latch pushes the mechanical linkage far enough that the other strip becomes visible.

In some embodiments, the latches of the seat hub are designed, as described above, so that only a designated latch will fit the detent 1130. Thus, the locking indicator 1110 will only activate when the correct seat orientation is achieved. It will be understood that other mechanical and non-mechanical alternatives can also be employed. For instance, the locking indicator can be an LED and/or can include a sound generator to produce an audible indicator. Such an indicator can be actuated mechanically, electrically, or magnetically. Some embodiments include two indicators, one to show that the base and the hub are rotationally engaged, and a second to show that the two are locked to prevent rotation.

Figure 11C:
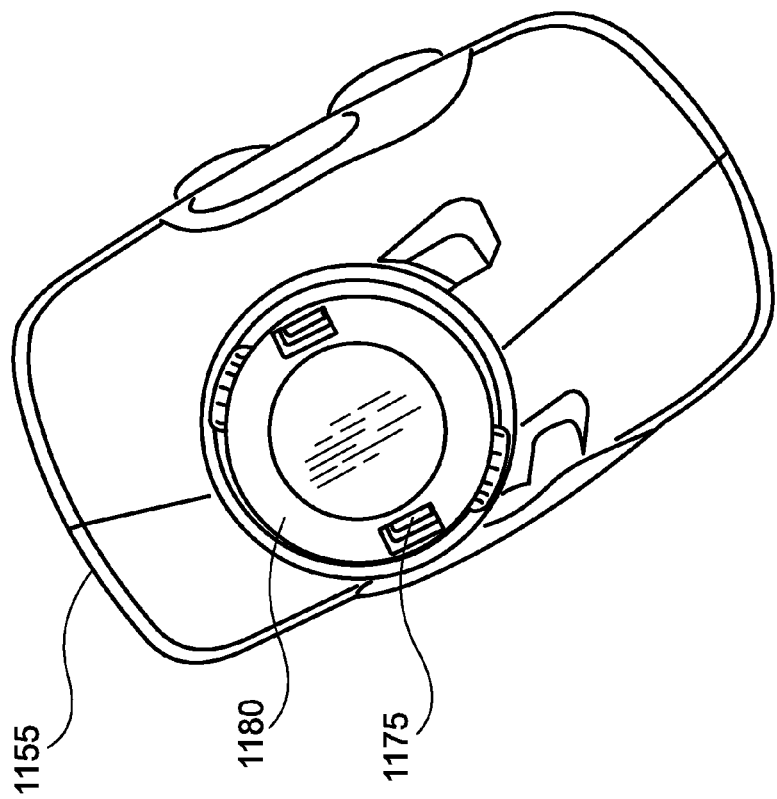
FIG. 11C is a bottom perspective view of a seat with a seat hub that engages with the base hub of FIG. 11B.
Figure 11B:
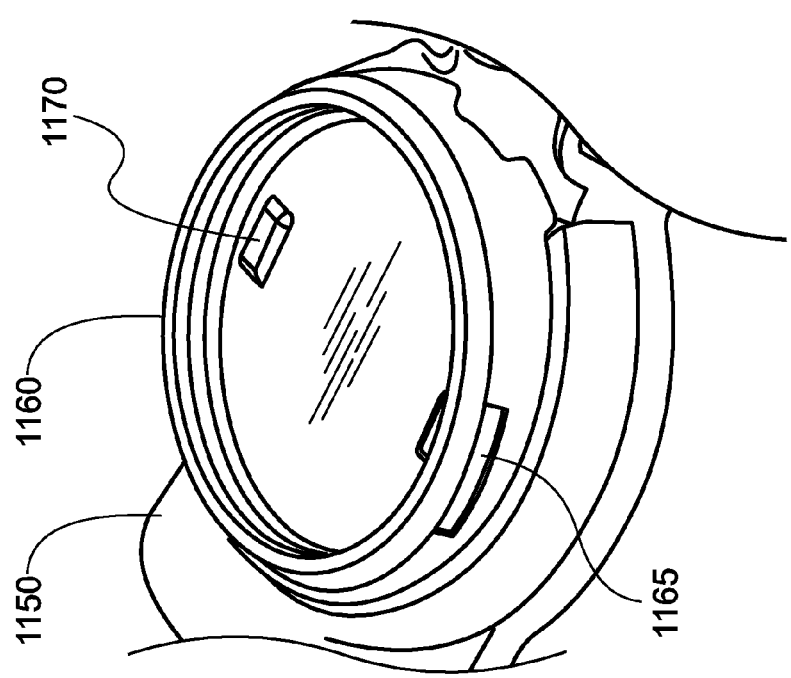
FIG. 11B is a perspective view of a base according to an embodiment of the invention showing a base hub with an alternative locking indicator.

Another embodiment of the present invention employs two locking indicators as shown in FIGS. 11B and 11C. FIG. 11B is a top perspective view of a base 1150 and FIG. 11C is a bottom perspective view of a seat 1155 according to this embodiment. The base 1150 includes a base hub 1160 that has two locking indicators 1165 (one hidden in FIG. 11B) that are independently activated when spring-loaded buttons 1170 of the base hub 1160 engage matching recesses 1175 in a seat hub 1180 of the seat 1155.

Figure 12:
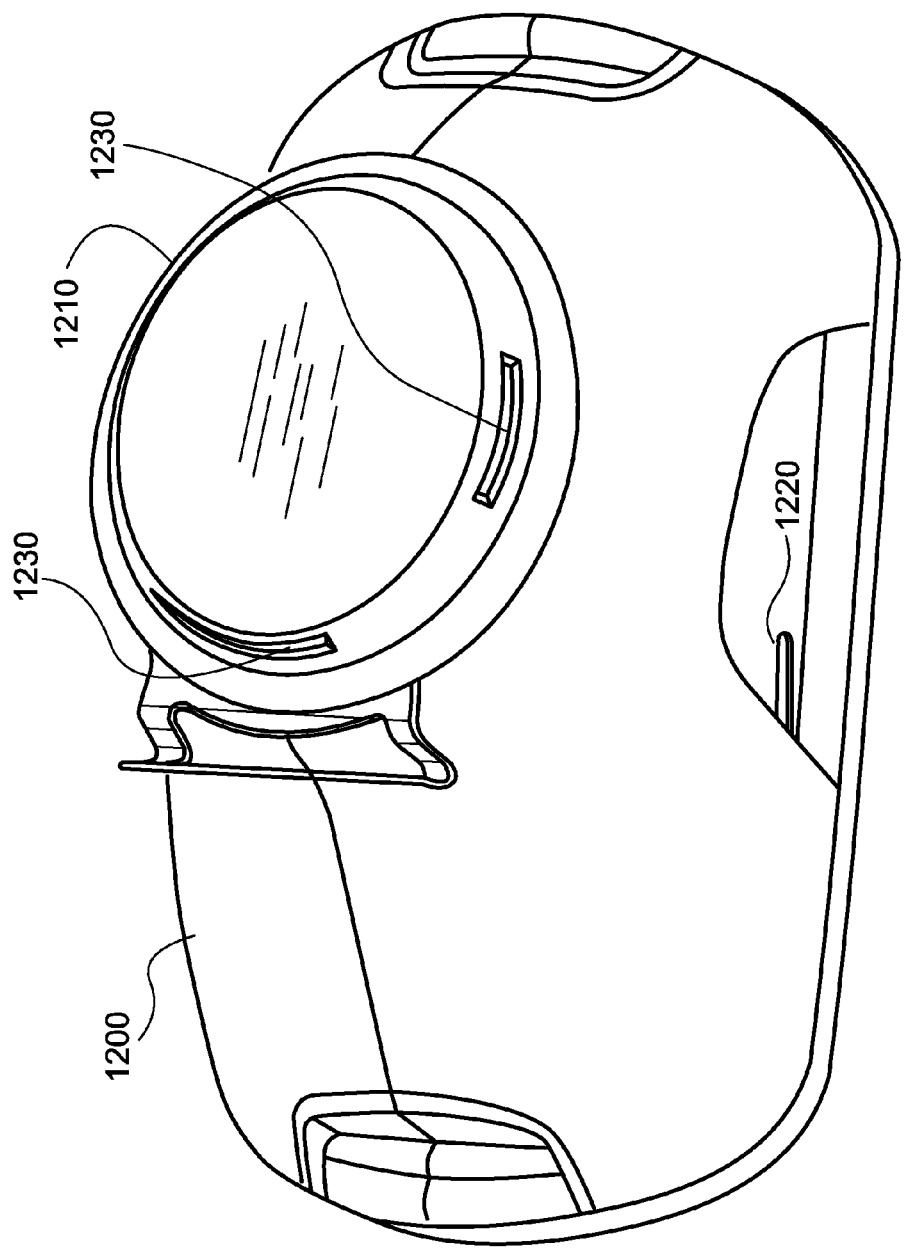
FIG. 12 is a bottom perspective view of a base according to an embodiment of the invention.

FIG. 12 shows a bottom perspective view of a seat 1200 including a seat hub 1210 and release lever 1220. A cable (not shown) runs through the body of the seat 1200 to the seat hub 1210 and is coupled to latches 1230. Activating the release lever 1220 retracts the latches 1230 so that the seat hub 1210 can be disengaged from the base hub. Further detail relating to embodiments for retracting the latches 1230 is described below.

Figure 14:
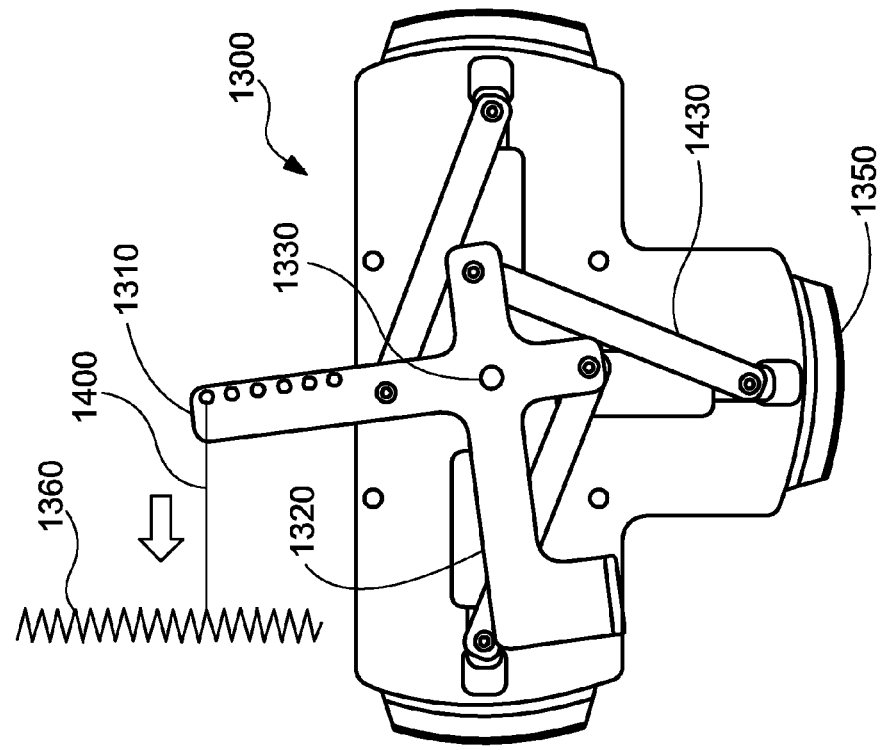
FIGS. 13 and 14 are top views of a latch mechanism, according to an embodiment of the invention, for engaging a seat hub with a base hub, respectively showing engaged and disengaged positions.
Figure 13:
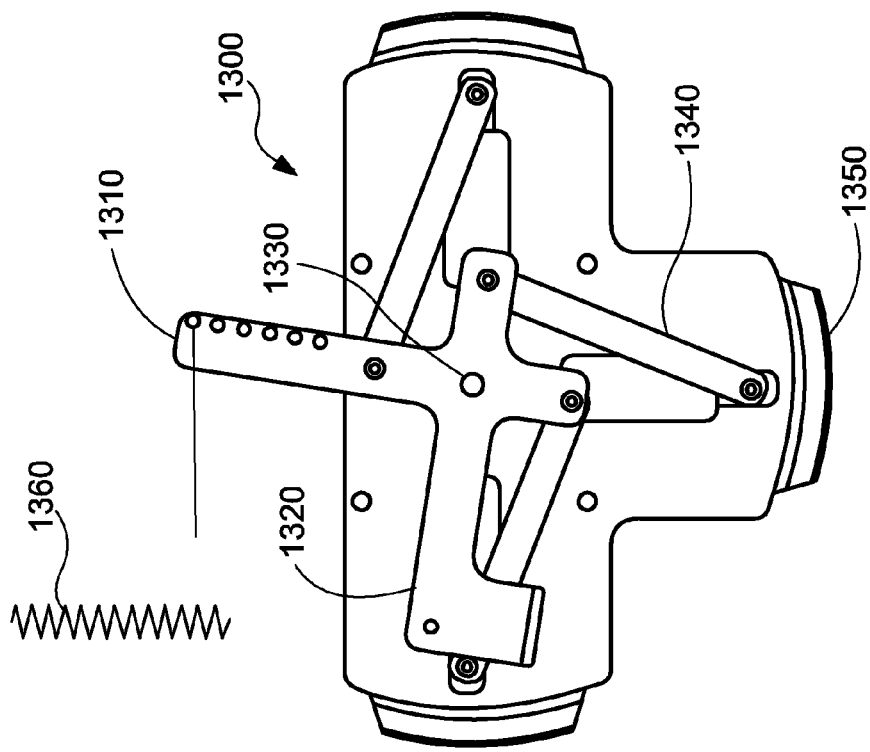

FIGS. 13 and 14 illustrate one embodiment of a mechanism that is activated by a cable for retracting the latches of a seat hub. FIG. 13 shows the mechanism 1300 at rest. The mechanism 1300 comprises two lever arms 1310, 1320 set at 90° to each other that are attached together at a pivot point 1330. Links 1340 join the lever arms 1310, 1320 to latches 1350. In FIG. 13 the latches 1350 are forced outward by a spring 1360 attached to lever arm 1310.

In FIG. 14 a force is applied to a cable 1400 attached to lever arm 1320. The cable 1400 can be actuated, for example, by a release lever as described above. The force on the cable 1400 rotates the two lever arms 1310, 1320 against the tension of the spring 1360, causing the spring 1360 to stretch. Rotating the two lever arms 1310, 1320 causes the links 1350 to pull the latches 1350 inward towards the pivot point 1330. Once the latches 1350 are retracted in this way, the seat hub can disengage from the base hub. Releasing the force on the cable 1400 allows the spring 1360 to restore the mechanism 1300 to the state shown in FIG. 13.

Figure 16:
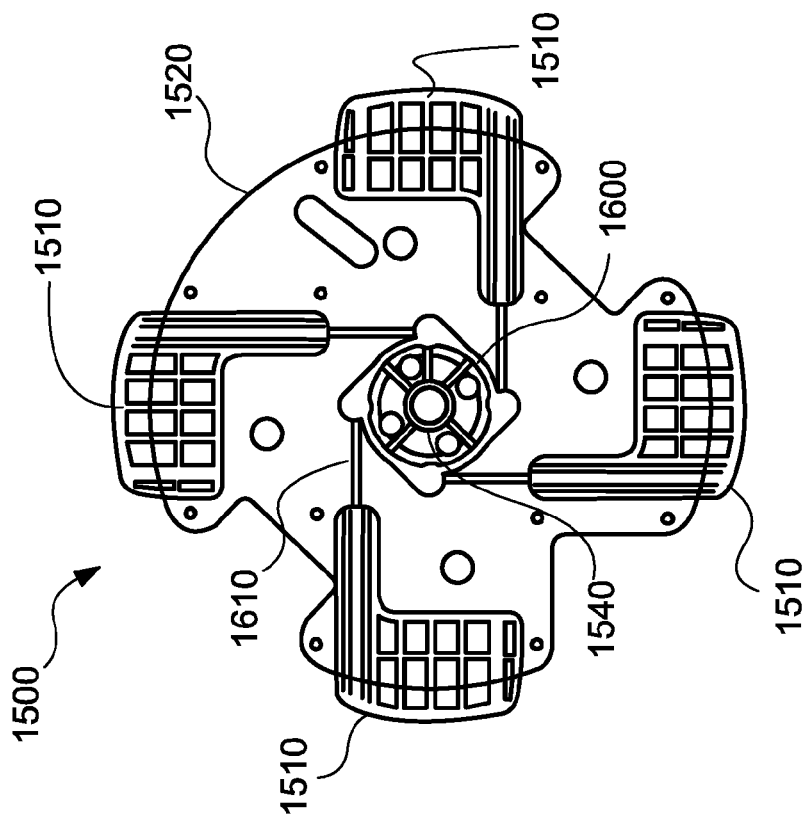
FIGS. 15 and 16 are, respectively, top and bottom views of a latch mechanism, according to another embodiment of the invention, for engaging a seat hub with a base hub.
Figure 15:
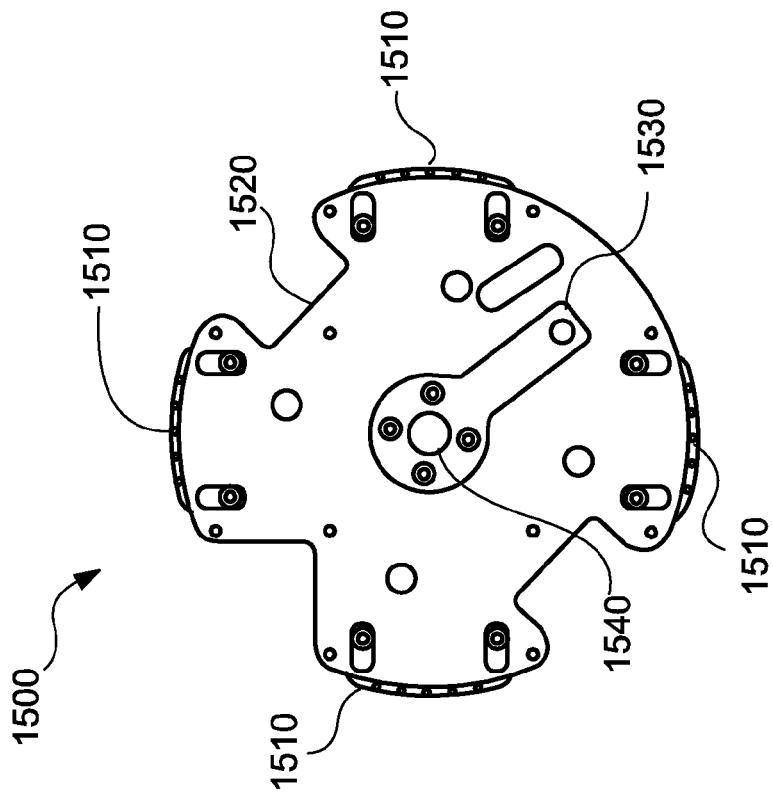

FIGS. 15 and 16 show top and bottom views of an alternative embodiment to the mechanism 1300 described with respect to FIGS. 13 and 14. Mechanism 1500 includes four latches 1510 instead of the three latches 1350 employed by mechanism 1300. The mechanism 1500 also includes a support plate 1520 to which the latches 1510 are slidably attached to an underside thereof. Additionally, mechanism 1500 includes a single lever 1530 disposed above the support plate 1520. The lever 1530 attaches to a cable (not shown) which is configured to pull the lever 1530 as in the previous embodiment. The lever 1530 attaches to a shaft 1540 that projects through the support plate 1520 and engages the center of a hub 1600 disposed below the support plate 1520. The hub 1600 engages spokes 1610 that connect to the latches 1510.

In operation, applying a force to the cable moves the lever 1530, the lever 1530 turns the shaft 1540 which rotates the hub 1600 and retracts the latches 1510. Releasing the cable then allows the mechanism 1500 to return to the state shown in FIGS. 15 and 16. It is also noted that a latch 1510' is more narrow than the other three latches 1510 in accordance with the discussion above. It is also noted that in FIG. 15 the latches 1510 are retracted while in FIG. 16 the latches 1510 are fully extended.

Also not shown in FIGS. 15 and 16 is the means for restoring the mechanism 1500 to the state shown in FIGS. 15 and 16. One alternative is to attach a spring to the lever 1530 to pull the lever 1530 so as to counteract the force exerted by the cable. Another alternative is to configure each latch 1510 with an independent spring on the underside of the support plate 1520. This alternative provides an additional degree of security.

Figure 17:
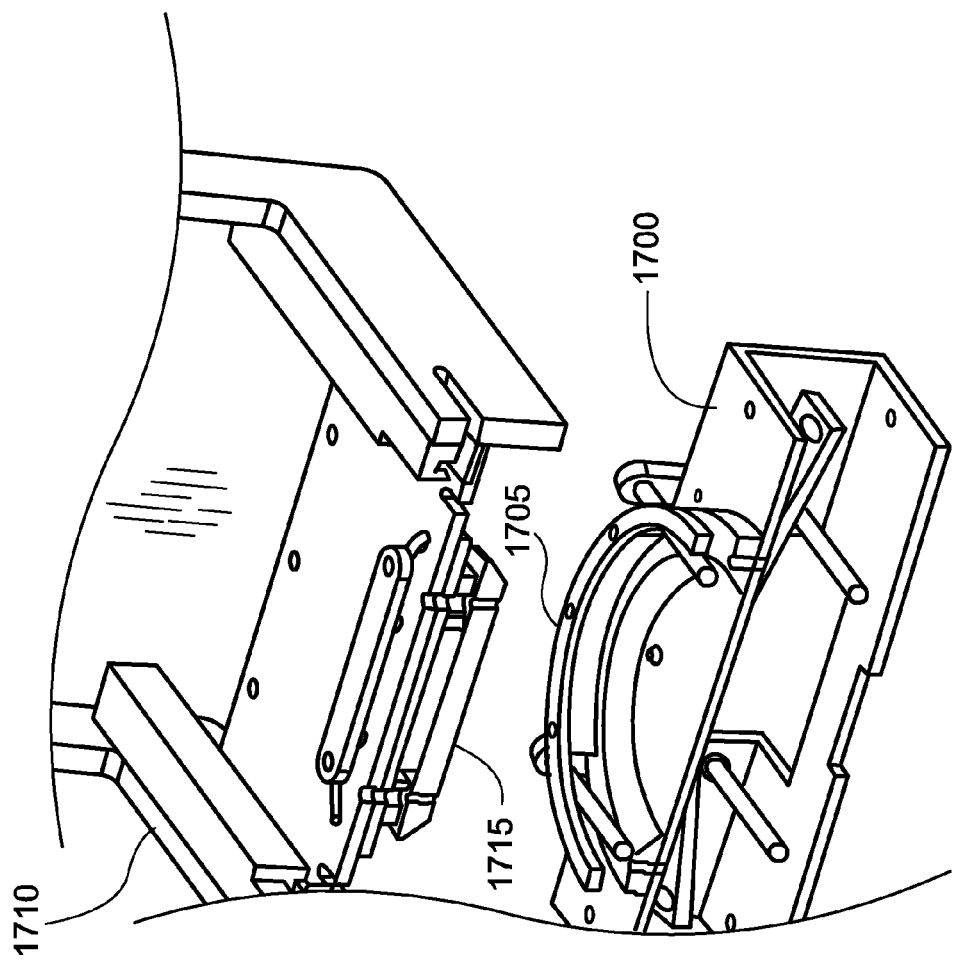
FIG. 17 is a perspective view of a cross-section of an engagement mechanism of an embodiment of the invention comprising base and seat hubs, prior to engagement.

FIGS. 17-27 illustrate yet another embodiment of an engagement mechanism that allows for rotation. FIG. 17 shows this engagement mechanism in a perspective view of a cross-section of a base 1700 including a base hub 1705, and a seat 1710 including a seat hub 1715. To better understand how the hubs 1705 and 1715 engage, disengage, and rotate relative to one another, the components of both hubs 1705 and 1715, and their operation, will first be discussed separately. It will be appreciated that although the components labeled as the base 1700 and seat 1710 are discussed herein as if integral with the overall structures of the base and seat (e.g. base 100 and seat 120 in FIG. 1), the base 1700 and seat 1710 can also be subassemblies that include the hubs 1705 and 1710 and that are ultimately bolted, welded, or otherwise permanently attached to the base and seat.

FIGS. 18 and 19 show bottom perspective views from two different angles of the seat 1710 and seat hub 1715 (i.e., flipped upside-down with respect to the perspective shown in FIG. 17). From FIG. 19 it can be seen that seat hub 1715 includes two cams 1900, one partially visible and the other disposed 180° away and hidden from view by retaining plate 1910. FIG. 20 shows another perspective view of the seat 1710 and seat hub 1715 with the retaining plate 1910 removed to better illustrate the cams 1900.

Figure 21:
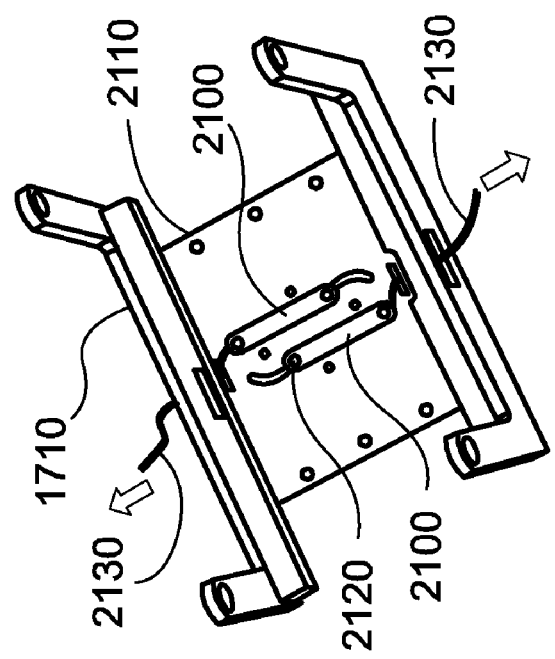
FIG. 21 is a top perspective view of the seat hub of the embodiment of FIG. 17.

FIG. 21 shows a top view of seat 1710. A 4-bar mechanism of the seat hub 1715 comprises two links 2100 each joined to the two cams 1900 through grooves cut into a center plate 2110. The 4-bar mechanism also comprises four rods (not shown) that connect the ends 2010 of the cams 1900 to the ends 2120 of the links 2100 and are constrained to move in the grooves in the center plate 2110. More specifically, the rods connect opposite ends 2120 of each link 2100 to each of the two cams 1900, and connect opposite ends 2010 of each cam 1900 to each of the two links 2100. Thus, the links 2100 and cams 1900 are interconnected and move in unison.

Each link 2100 is also attached to a cable 2130 for actuating the 4-bar mechanism. The other end of the cable 2130 can be attached, for example, to a release lever on the seat 1710. Because the 4-bar mechanism moves in unison, pulling on either cable 2130 is sufficient to move both links 2100 and both cams 1900. As will be described below, actuating the cams 1900 is necessary to disengage the seat hub 1715 from the base hub 1705. It is noted that in FIGS. 20 and 21 the 4-bar mechanism is in the fully actuated position.

Figure 22:
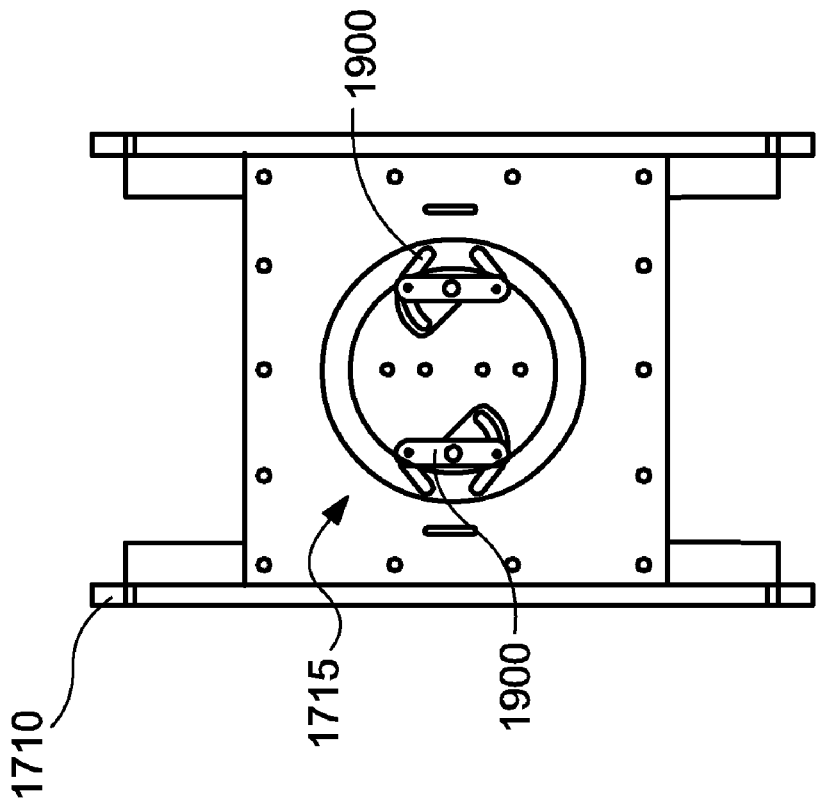
FIG. 22 is a bottom view of the seat hub of the embodiment of FIG. 17, partially disassembled as in FIG. 20.

FIG. 22 shows a bottom view of the seat 1710 and seat hub 1715 with the retaining plate 1910 removed to illustrate the cams 1900 in the fully non-actuated position. Though not illustrated, it will be understood that the seat hub 1715 includes one or more cam springs configured to hold the cams in the fully non-actuated position. Thus, pulling on the cable 2130 works against the cam spring. In this way the amount of force necessary to disengage the seat hub 1715 from the base hub 1705 can be set by the strength of the cam spring to prevent accidental disengagement.

Figure 23:
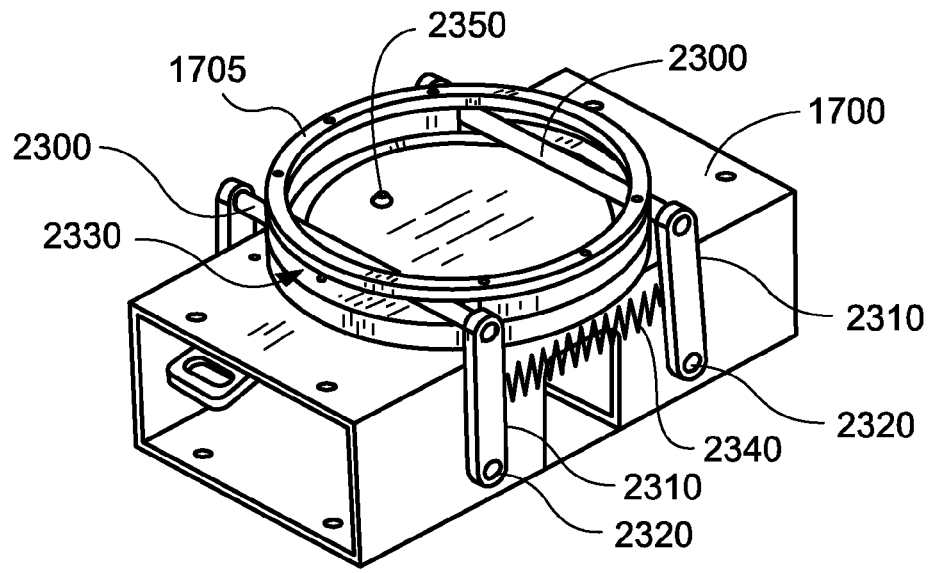
FIGS. 23 and 24 are top perspective views of the base hub of the embodiment of FIG. 17.

Turning now to the base 1700 and the base hub 1705, FIG. 23 shows that the base hub 1705 includes two retaining bars 2300 that retain the seat hub 1715 when the two hubs 1705, 1715 are engaged, as described below. Each retaining bar 2300 is supported at either end by a lever arm 2310. Each lever arm 2310 is pivotally attached to the base hub 1705. Accordingly, the two retaining bars 2300 are configured to pivot around the pivot points of attachment 2320 of the lever arms 2310. The base hub 1705 also includes two slots 2330 within which the retaining bars 2300 move when pivoted. A spring 2340 between lever arms 2310 of the two retaining bars 2300 (a second spring can also be symmetrically located on the opposite side of the base hub 1705) holds the retaining bars 2300 within the slots 2330.

Figure 24:
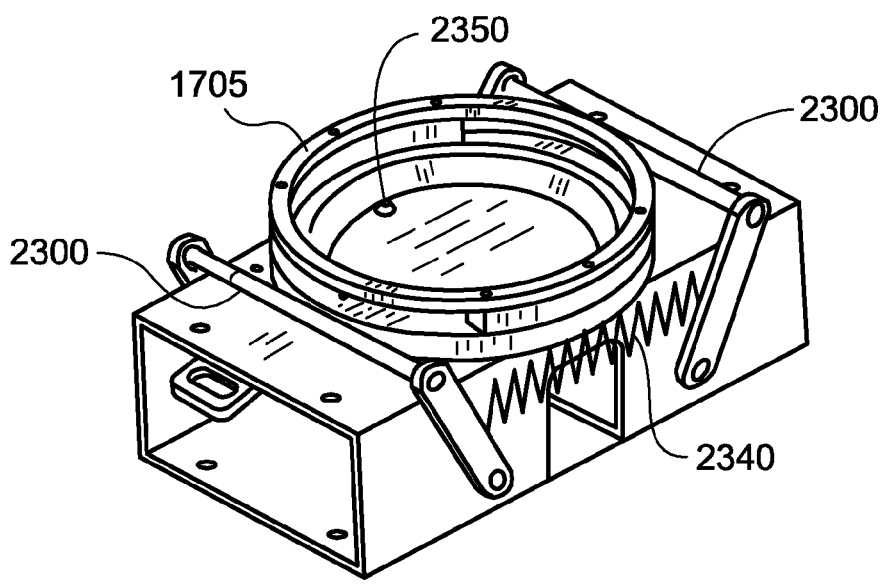

FIG. 24 shows the same base hub 1705 as in FIG. 23, but with the retaining bars 2300 pivoted outward against the force of the spring 2340. As described below, the retaining bars 2300 engage behind the retaining plate 1910 of the seat hub 1715 to secure the seat hub 1715 to the base hub 1705. Base hub 1705 also comprises a locking pin 2350 that engages the seat hub 1715 to prevent the seat hub 1715 from rotating within the base hub 1705 unless the locking pin 2350 is withdrawn, as also described further below.

Figure 25:
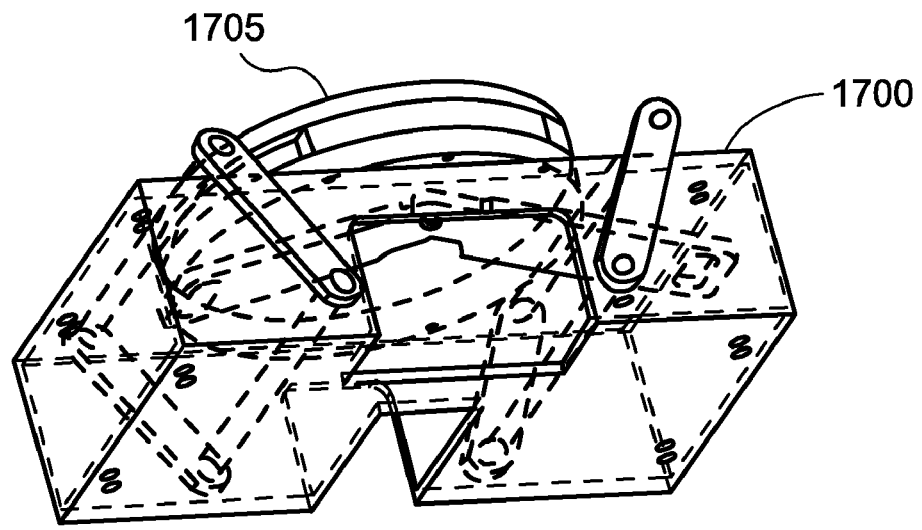
FIG. 25 is a bottom perspective view of the base hub of the embodiment of FIG. 17.
Figure 26:
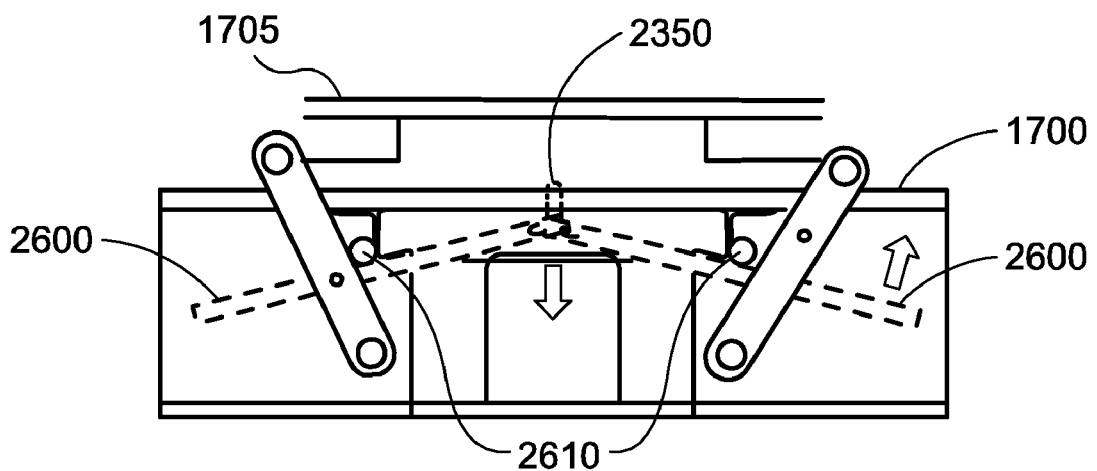
FIG. 26 is a side view of the base hub of the embodiment of FIG. 17.

FIGS. 25 and 26 show, respectively, a bottom perspective view and a side view of the base 1700 and base hub 1705. It can be seen from these drawings that rotation levers 2600 pivotally engage the locking pin 2350 from the underside of the base hub 1705. Each rotation lever 2600 is also pivotally connected to the hub 1700 by a spring-loaded pivot mechanism 2610 that keeps the rotation levers 2600 and locking pin 2350 in the position shown. Pulling up on either rotation lever 2600, as indicated, draws the locking pin 2350 down so that the seat hub 1715 can rotate. For clarity, the spring 2340 has been omitted from FIGS. 25 and 26.

Figure 27:
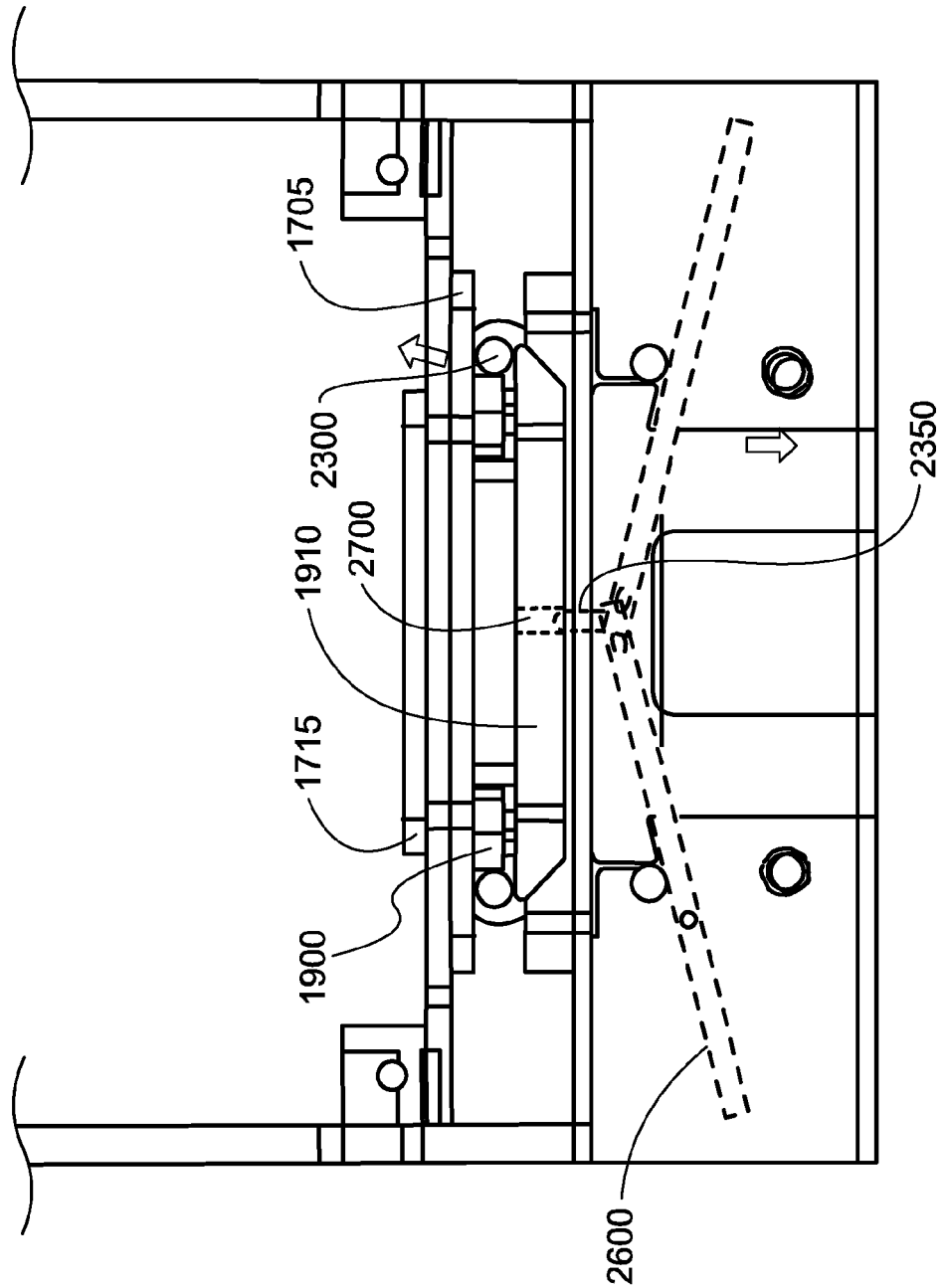
FIG. 27 is a cross-sectional view of the engagement mechanism of FIG. 17 with the base and seat hubs engaged.

With reference now to FIG. 27, which shows a cross-sectional view of the base hub 1705 and the seat hub 1715 fully engaged, and with reference again to FIG. 17, the engagement, disengagement, and rotation of the seat 1710 and base 1700 can now be fully explained. To engage the base hub 1705 with the seat hub 1715, the seat 1710 is positioned over the base 1700 so that the retaining plate 1910 of the seat hub 1715 is centered over the base hub 1705. The retaining plate 1910 includes a lip having a beveled lower edge that pushes the two retaining bars 2300 laterally against the force of the spring 2340 (not shown in FIGS. 17 and 27) as the seat hub 1715 is forced down against the base hub 1705. Once the widest point of the retaining plate 1910 passes the retaining bars 2300, the retaining bars 2300 are pulled back by the spring 2340 to engage behind the lip of the retaining plate 1910 as shown in FIG. 27. Thus, the retaining bars 2300 help to pull the seat hub 1715 down into the base hub 1705 and come to rest against the cams 1900.

It will be apparent that the seat hub 1715 can be engaged in this way with the base hub 1705 in any rotational orientation, as once engaged, the two are generally free to rotate with respect to one another. However, the retaining plate 1910 also includes a recess 2700 that can engage the locking pin 2350 to stop the rotation. As described above, pulling up on either rotation lever 2600 will draw the locking pin 2350 down out of the recess 2700 so that the seat hub 1715 can again rotate. The circumferential position of the locking pin 2350 is chosen so that when the locking pin 2350 engages the recess 2700 the seat 1710 is in a desired orientation relative to the base 1700. In this way, for example, an infant seat 110 (FIG. 1) will lock in the rear-facing orientation. It will be understood that more than one recess 2700 can be used to provide more than one locked position.

To disengage the two hubs 1705 and 1715, the retaining bars 2300 must be pushed out from behind the lip of the retaining plate 1910 so that the seat hub 1715 is free to be removed from the base hub 1705. This is accomplished by the cams 1900 which are actuated by pulling on a cable 2130 (FIG. 21; not shown in FIGS. 17 and 27) as discussed above. When the cams 1900 are fully activated, as shown in FIG. 20, the cams 1900 push the retaining bars 2300 beyond the retaining plate 1910.

Figure 28:
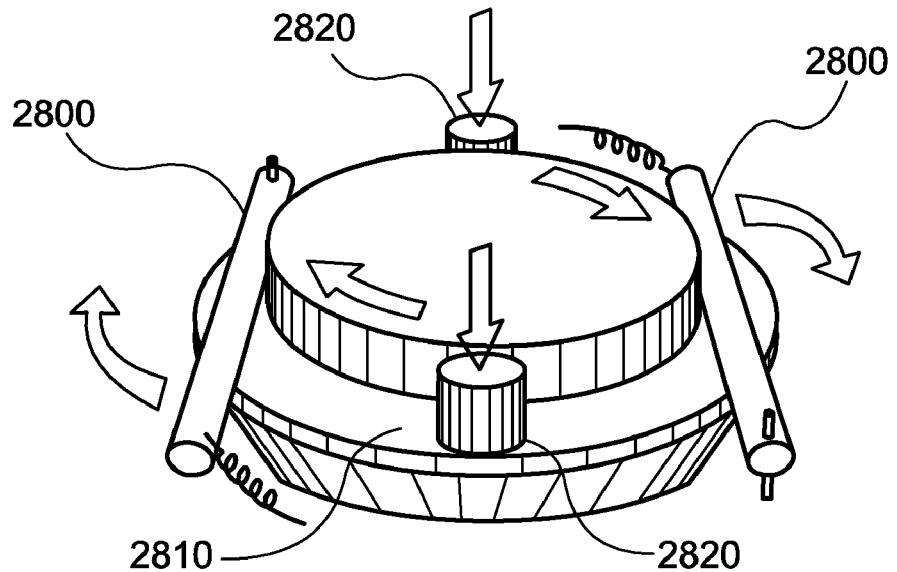
FIG. 28 is a perspective view of components of an engagement mechanism according to another embodiment of the invention.
Figure 29:
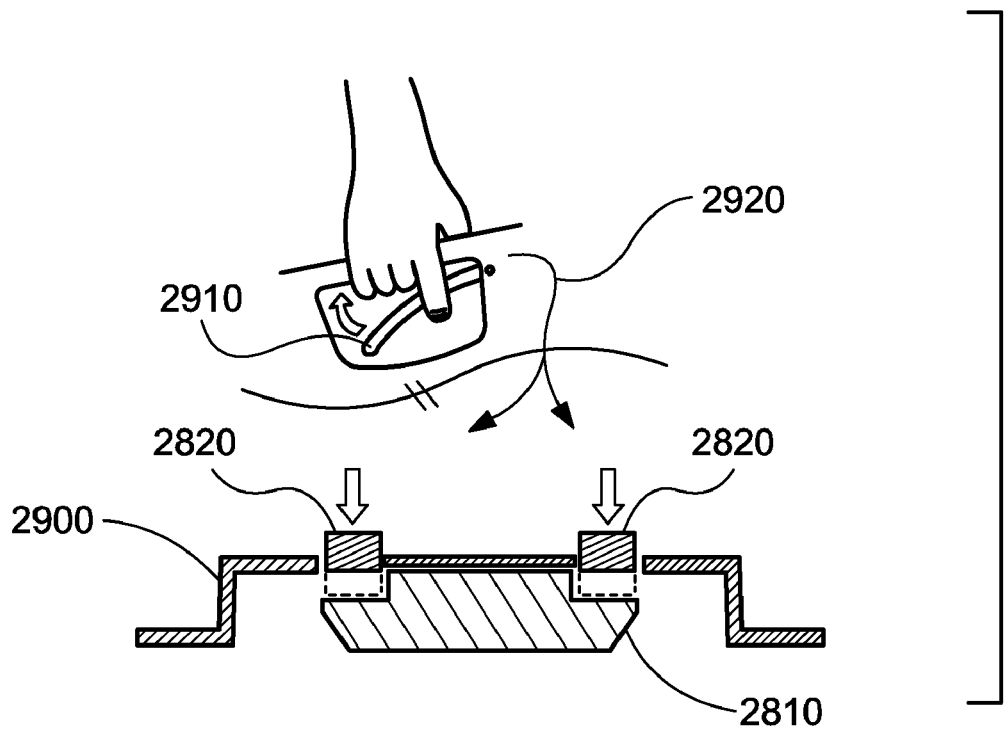
FIG. 29 is a schematic representation, including a cross-section through the embodiment of FIG. 28, to illustrate the activation thereof.
Figure 30:
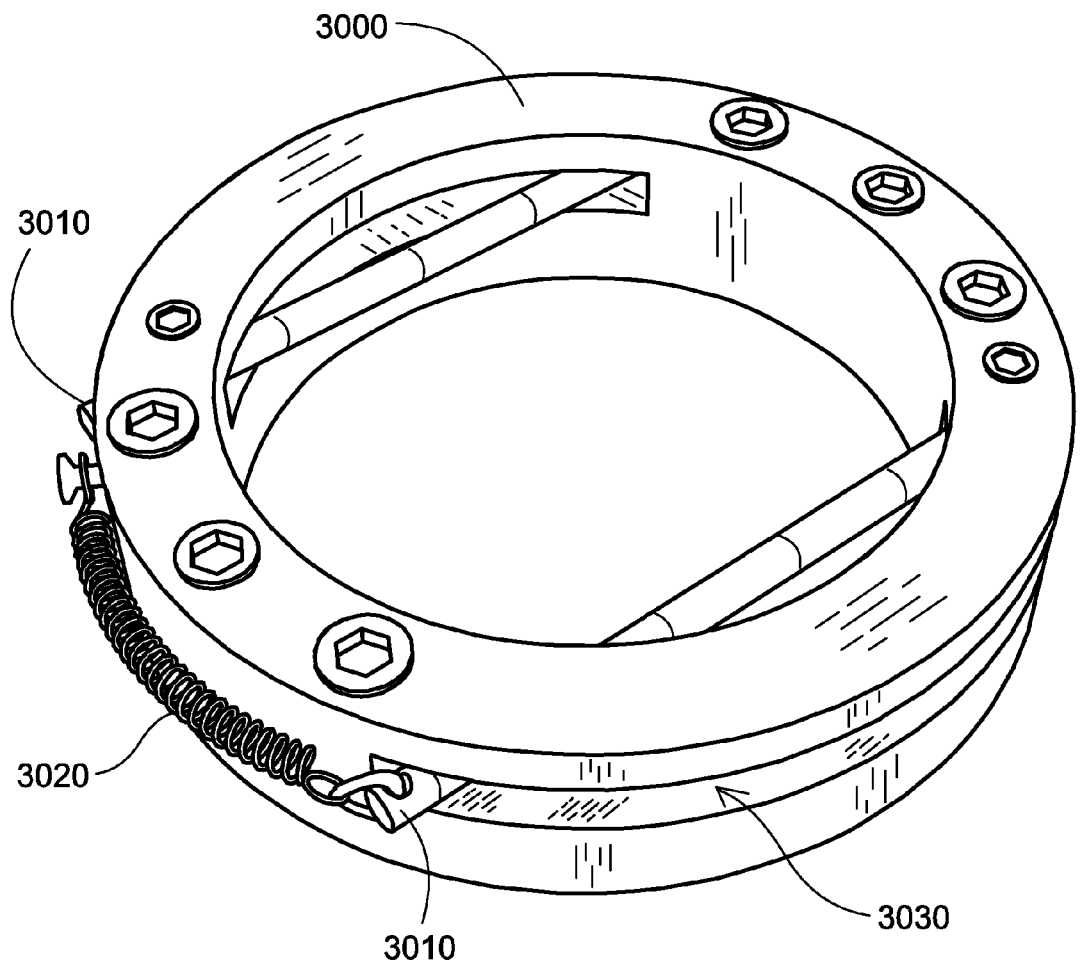
FIG. 30 is an exemplary base hub according to another embodiment of the invention.

FIGS. 28-30 illustrate still another embodiment of the invention having vertically actuated cams. FIG. 28 shows a perspective view of this embodiment. In FIG. 28 retaining bars 2800 of a base hub (not otherwise shown) such as base hub 1705 described above are engaged behind a retaining plate 2810 of a seat hub (also not otherwise shown) such as seat hub 1715. Two vertically actuated cams 2820 of the seat hub are shown in the fully actuated position. When actuated as shown, rotating the seat hub causes the vertically actuated cams 2820 to push the retaining bars 2800 out from behind the retaining plate 2810.

FIG. 29 shows a cross section through a seat hub 2900 of this embodiment. As shown, the vertically actuated cams 2820 when not actuated are retracted to allow unimpeded rotation of the seat hub 2900 within the base hub. Only when the vertically actuated cams 2820 are actuated (dotted outline) and pushed downward will rotation of the seat hub 2900 cause the seat hub 2900 to disengage from the seat hub. FIG. 29 also schematically shows a mechanism for actuating the vertically actuated cams 2820. Here, a user pulls up on a release lever 2910 attached to a handle of the seat to which the seat hub 2900 is attached. A cable 2920 attached to the release lever 2910 drives a mechanism (not shown) that forces the vertically actuated cams 2820 downward. A return spring (not shown) provides a restorative force that otherwise keeps the vertically actuated cams 2820 in the non-actuated position and gives a resistance to the mechanism so that a threshold amount of force must be applied to the cable 2920 to move the vertically actuated cams 2820.

FIG. 30 shows a photograph of a prototype of another embodiment of a base hub 3000. Although base hub 3000 is discussed in connection with the seat hub 2900 embodiment of FIG. 29, it will be understood that it will also work with seat hub 1715, discussed above. In this embodiment the retaining bars 3010 are not situated on the ends of lever arms that are coupled by a spring, as in base hub 1705, but are instead directly coupled by springs 3020 (one spring 3020 is hidden in FIG. 30). As above, the retaining bars 3010 are constrained to move within grooves 3030 and otherwise function to engage the retaining plate 2910 as described previously.

Figure 31:
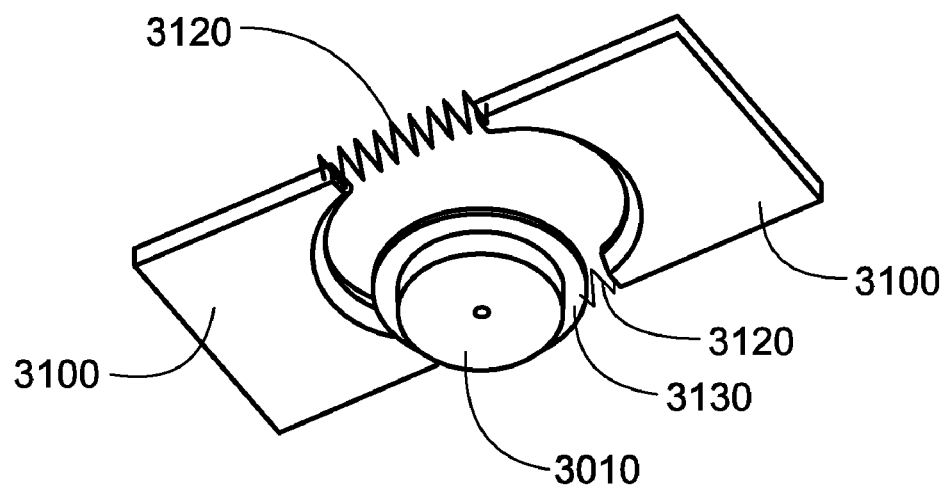
FIG. 31 is a bottom perspective view of components of an engagement mechanism according to still another embodiment of the invention.
Figure 32:
FIGS. 32 and 33 are cross-sectional views of the mechanism of FIG. 31 engaged and disengaged, respectively.
Figure 33:
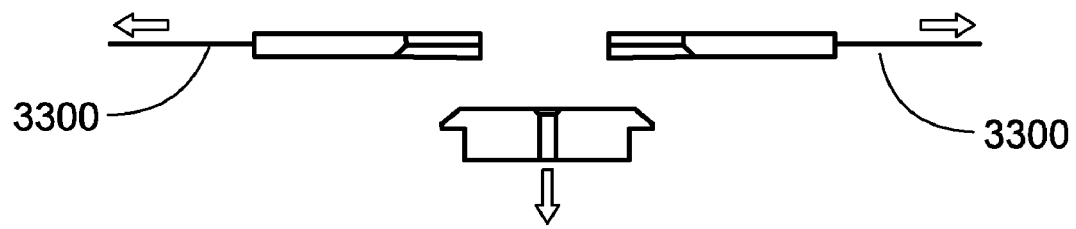

FIGS. 31-33 show still another embodiment. In this embodiment a retaining plate is attached to a base rather than to a seat as in the previously described embodiment, however, this embodiment is not limited to this arrangement and can also be implemented with the retaining plate attached to the seat. FIG. 31 shows a bottom perspective view of a retaining plate 3100 attached to a base (not shown), and a pair of retaining members 3110 slidably attached to a seat (also not shown) and configured to engage the retaining plate 3100. A pair of springs 3120, for example, provide a restorative force to keep the retaining members 3110 mated together. As shown, each retaining member 3110 includes a semi-circular recess so that when mated together, the retaining members 3110 form an aperture with a beveled surface. The retaining plate 3100 has a matching beveled surface, as can be seen more readily in FIGS. 32 and 33 which are cross-sections through the retaining plate 3100 and retaining members 3110.

When the seat is engaged with the base, in this embodiment, the aperture formed between the retaining members 3110 is positioned over the retaining plate 3100 and the seat is forced downward so that the beveled surface of the retaining plate pushes against the beveled surfaces of the retaining members 3110 and forces the retaining members 1110 apart against the force of the springs 3120. After a lip 3130 of the retaining plate 3100 passes the retaining members 3110, the retaining members 3110 close behind the lip 3130, as shown in FIG. 32. It can be seen from FIG. 32 that the retaining members 3110 engage the lip 3130 to prevent the retaining plate 3100 from being withdrawn, yet the retaining plate 3100 is free to rotate within the aperture. In one embodiment, shown in FIG. 33, force applied to a pair of cables 3300 attached to the retaining members 3110 pulls the retaining members 3110 apart to release the retaining plate 3100.

Figure 34:
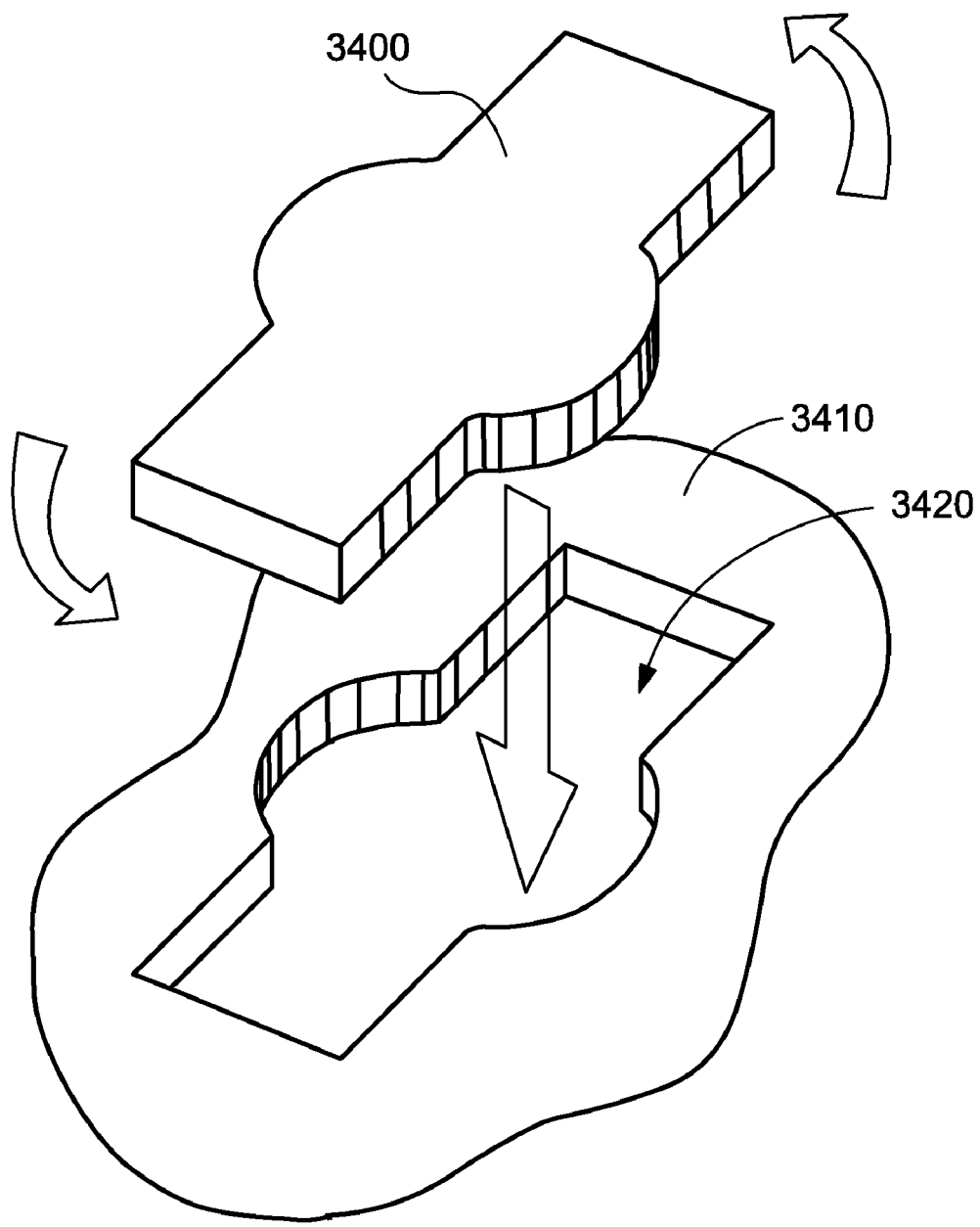
FIG. 34 is a perspective view of an engagement mechanism according to yet another embodiment of the invention.

A further embodiment is shown in FIG. 34. This embodiment resembles a lock and key and is deemed to be passive in that it does not include moving parts. As can be seen from FIG. 34, either of the seat or the base is fitted with a retaining plate 3400 and the opposing component is fitted with a receiving chamber 3410 having an aperture 3420 shaped to match the specific shape of the retaining plate 3400. The retaining plate can only be inserted or removed through the aperture 3420 when the retaining plate 3400 is properly aligned. Once engaged, the retaining plate 3400 can rotate freely within the receiving chamber 3410.

Here, the symmetry of the shape of the retaining plate 3400 determines how many orientations the seat can be in, relative to the base, when engaging and disengaging. A complete lack of symmetry means that the two can only be engaged and disengaged in one position, whereas the two-fold symmetry of the example in FIG. 34 allows for two positions. For example, with the rear-facing infant seat 110 (FIG. 1), the seat would have to be oriented either 90° clockwise or counterclockwise from the rear-facing orientation (i.e., facing either passenger door) in order to engage or disengage.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed as new and desired to be protected by Letters Patent of the United States is:

1. A modular child restraint system comprising:
    a seat comprising a seat hub having a circumferential lip and at least two detents; and
    a base comprising a base hub having at least two retractable latches configured to engage the circumferential lip of the seat hub, wherein each of the at least two retractable latches further comprises a retractable, spring-loaded latch, with an engaging face configured to cause compression of the retractable, spring-loaded latch as the engaging face guides the retractable, spring-loaded latch under the circumferential lip, and a retaining face to engage the circumferential lip.

2. The modular child restraint system of claim 1, wherein the base is configured to be attached to a vehicle seat.

3. The modular child restraint system of claim 1, wherein the base further comprises a release lever to retract the at least two retractable latches to disengage the seat hub from the base hub.

4. The modular child restraint system of claim 1, wherein the base is part of a stroller.

5. The modular child restraint system of claim 1, wherein the seat is configured to be locked in a position relative to the base.

6. The modular child restraint system of claim 1, further comprising a visual indicator configured to change color in response to the seat being rotationally locked with the base.

7. The modular child restraint system of claim 1, wherein:
the seat hub is configured to rotationally engage with the base hub and the base hub is further configured to lock into one or more of the detents to prevent rotation of the seat relative to the base.

8. The modular child restraint system of claim 1, wherein the seat further comprises a retractable locking pin configured to engage the base hub to prevent rotation of the seat hub relative to the base hub.

9. The modular child restraint system of claim 1, wherein at least one of the at least two retractable latches is sized differently than another of the least two retractable latches to engage at least one of the at least two detents in a single rotational position.

10. The modular child restraint system of claim 1, further comprising an audible indicator configured to play a sound in response to the seat being rotationally locked into the base.

11. A modular child restraint system comprising:
a base including a base hub having a circumferential lip and a plurality of detents; and
a seat including a seat hub configured to rotationally engage with the base hub and having at least two retractable latches configured to engage under the circumferential lip to secure the seat hub to the base hub, and to lock into the detents to prevent rotation of the seat relative to the base,
wherein the seat hub further comprises a release lever to retract the at least two latches to disengage the seat hub from the base hub.

12. The modular child restraint system of claim 11 further comprising an indicator configured to indicate whether the seat hub is rotationally locked with the base hub.

13. The modular child restraint system of claim 11, wherein the base is configured to be attached to a vehicle seat.

14. The modular child restraint system of claim 11, wherein the base is permanently installed in a vehicle seat.

15. The modular child restraint system of claim 11, wherein the base is part of a stroller.

16. The modular child restraint system of claim 11, wherein the seat is configured to be locked in a position relative to the base.

17. The modular child restraint system of claim 11, wherein the release lever is coupled to:
at least two lever arms attached at a pivot point; and
at least two links, each coupled to at least one of the at least two lever arms and at least one of the at least two retractable latches.

18. The modular child restraint system of claim 11 further comprising four retractable latches configured to engage under the lip.

19. The modular child restraint system of claim 18 wherein only one of the four latches is sized to lock into the detents.

* * * * *